(12) United States Patent
Meredith et al.

(10) Patent No.: US 7,702,749 B2
(45) Date of Patent: Apr. 20, 2010

(54) TYPE CHECKING FOR SAFE INTEROPERABILITY AMONG WEB PROCESSES

(75) Inventors: L. Gregory Meredith, Seattle, WA (US); Steve Bjorg, Redmond, WA (US); David Richter, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1785 days.

(21) Appl. No.: 10/338,165

(22) Filed: Jan. 7, 2003

(65) Prior Publication Data

US 2004/0064529 A1 Apr. 1, 2004

Related U.S. Application Data

(63) Continuation-in-part of application No. 10/262,551, filed on Sep. 30, 2002, now abandoned.

(51) Int. Cl.
G06F 15/16 (2006.01)
G06F 3/00 (2006.01)
(52) U.S. Cl. .............. 709/219; 709/203; 709/230; 719/313
(58) Field of Classification Search .......... 709/219, 709/203, 230; 719/313
See application file for complete search history.

(56) References Cited

U.S. PATENT DOCUMENTS

| | | | | |
|---|---|---|---|---|
| 5,920,861 A * | 7/1999 | Hall et al. | ........... | 707/9 |
| 6,073,113 A * | 6/2000 | Guinan | ........... | 705/26 |
| 6,102,969 A * | 8/2000 | Christianson et al. | ....... | 717/146 |
| 6,430,569 B1 | 8/2002 | Bracha et al. | | |
| 6,438,615 B1 | 8/2002 | Faustini | | |
| 6,601,114 B1 | 7/2003 | Bracha et al. | | |
| 2002/0120704 A1 * | 8/2002 | Karp et al. | ........... | 709/207 |
| 2002/0133643 A1 | 9/2002 | Bracha et al. | | |
| 2003/0015628 A1 | 1/2003 | Rivera | | |
| 2003/0033369 A1 * | 2/2003 | Bernhard | ........... | 709/203 |
| 2003/0055868 A1 | 3/2003 | Fletcher et al. | | |
| 2003/0055878 A1 | 3/2003 | Fletcher et al. | | |
| 2003/0097286 A1 | 5/2003 | Skeen | | |
| 2003/0135628 A1 | 7/2003 | Fletcher et al. | | |
| 2003/0204645 A1 | 10/2003 | Sharma et al. | | |
| 2003/0225935 A1 | 12/2003 | Rivard et al. | | |
| 2003/0233491 A1 | 12/2003 | Bracha et al. | | |

OTHER PUBLICATIONS

Abramsky, S., "Computational Interpretations of Linear Logic," *Theoretical Computer Science* 111(1-2):3-57, 1993.

Berger, M., et al., "Sequentiality and the π-Calculus," in Abramsky, S. (ed.), *Proceedings: Typed Lambda Calculi and Applications, 5th Int'l Conference*, Krakow, Poland, May 2-5, 2001.

Milner, R., "The Polyadic π-Calculus: A Tutorial," *Proceedings: Int'l Summer School on Logic Algebra of Specification*, Marktoberdorf, Germany, 1992.

(Continued)

*Primary Examiner*—Philip J Chea
(74) *Attorney, Agent, or Firm*—Lee & Hayes, PLLC

(57) ABSTRACT

The joining of Web services is accomplished via a virtual contract through the use of safeties. The joining of Web services heightens the safe interoperability of Web services to create greater functionality than each Web service alone can provide. Web services are joined for interoperability when the type of a port of one Web service is compatible with the type of another port of another Web service.

33 Claims, 27 Drawing Sheets

OTHER PUBLICATIONS

Tapang, C. C., "Web Services Description Language (WSDL) Explained" [online], Jul. 2001, <http://msdn.microsoft.com/library/en-us/dnwebsrv/html/wsdlexplained.asp> [retrieved Jan. 17, 2003].

Yoshida, N., et al., "Strong Normalisation in the π-Calculus," *MCS Technical Report*, Sep. 2001, Mar. 2001.

Curbera, F., et al., "Unraveling the Web Services Web: An Introduction to SOAP, WDSL, and UDDI," *Internet Computing, IEEE* 6(2):88-90, Mar. 2002.

Nakajima, S., "On Verifying Web Service Flows," *Proceedings of the 2002 Symposium on Applications and the Internet (SAINT) Workshops*, NEC Corporation, Jan. 28-Feb. 1, 2002, pp. 223-224.

Tsai, W.T., et al., "Extending WSDL to Facilitate Web Services Testing," *Proceedings of the 7th IEEE International Symposium on High Assurance Systems Engineering*, Arizona State University, Tempe, AZ, Oct. 2002, pp. 171-172.

Arkin, Assaf et al., "Web Service Choreography Intervace (WSCI) 1.0", retrieved on the internet on Sep. 20, 2007 at <<http://www.w3.org/TR/wsci/>>, Aug. 8, 2002, pp. 1-102.

Mecella, Massimo et al., "Compatibility of e-Services in a Cooperative Multi-platform Environment" retrieved from the internet on Sep. 20, 2007 at <<http://citeseer.ist.psu.edu/mecella01compatibility.html>>, Lecture Notes in Computer Science, vol. 2193, Sep. 15, 2001, pp. 44-57.

* cited by examiner

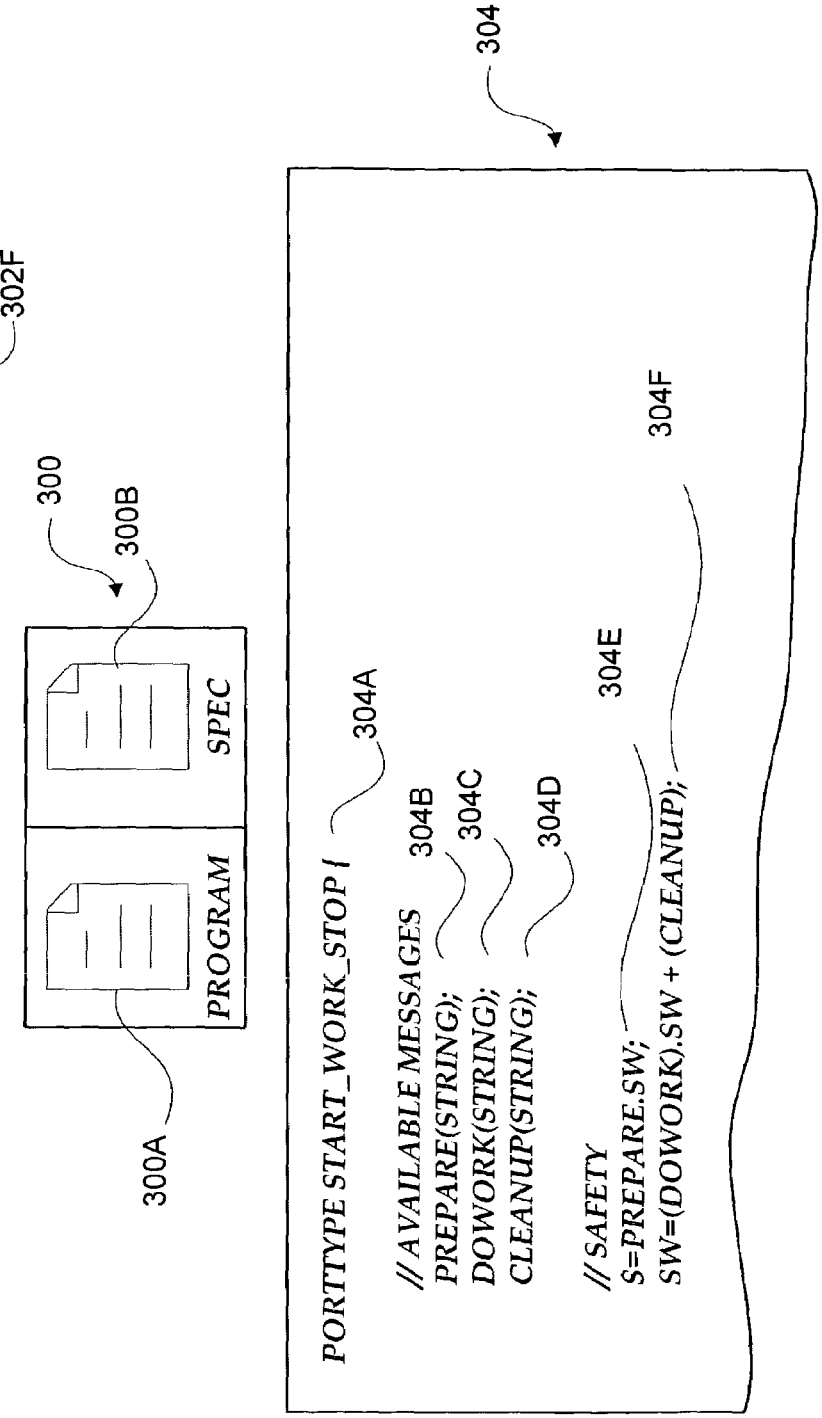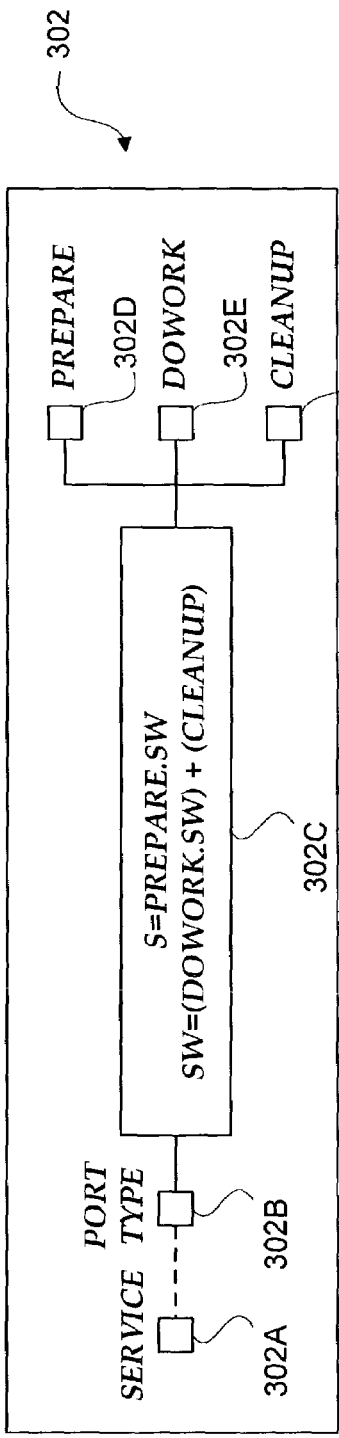
Fig.3A.  Fig.3B.  Fig.3C.

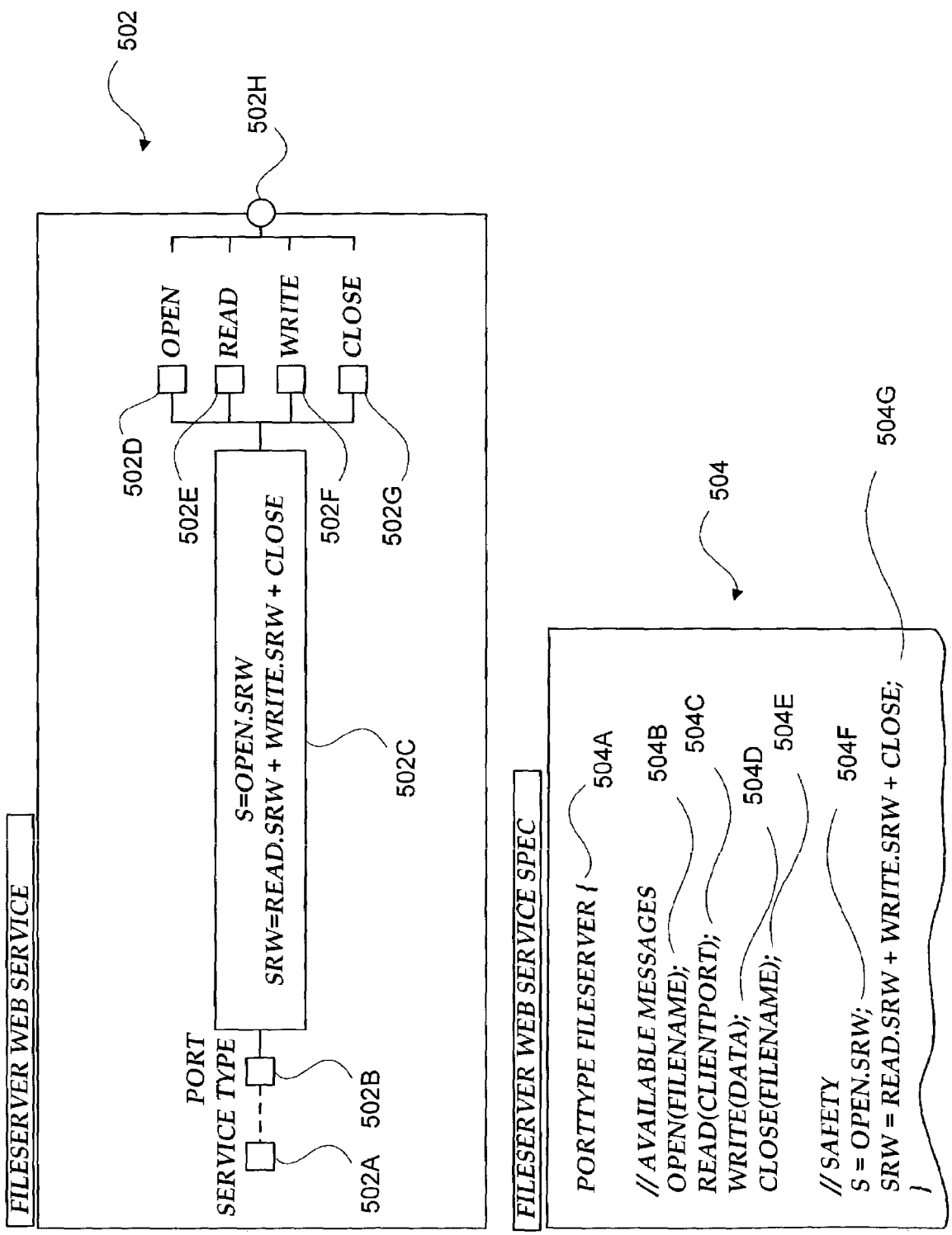

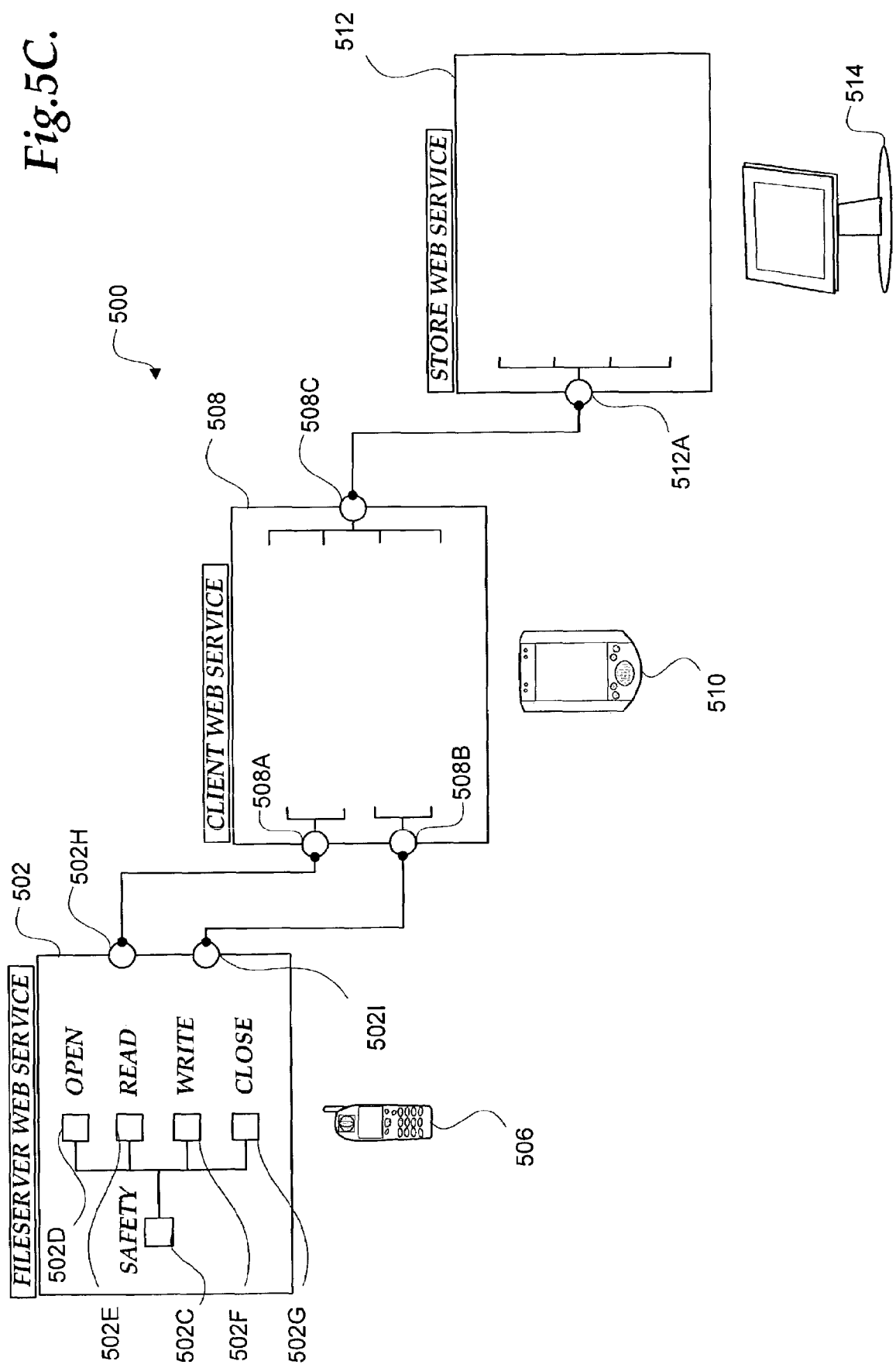

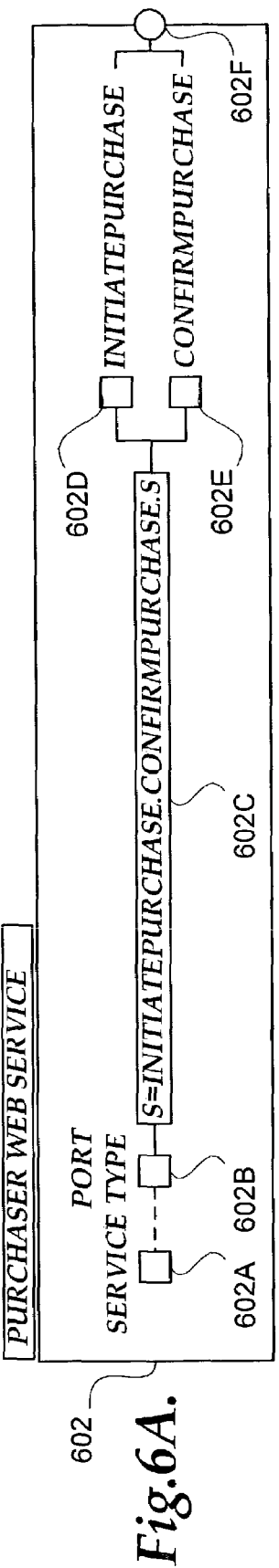
*Fig.6A.*
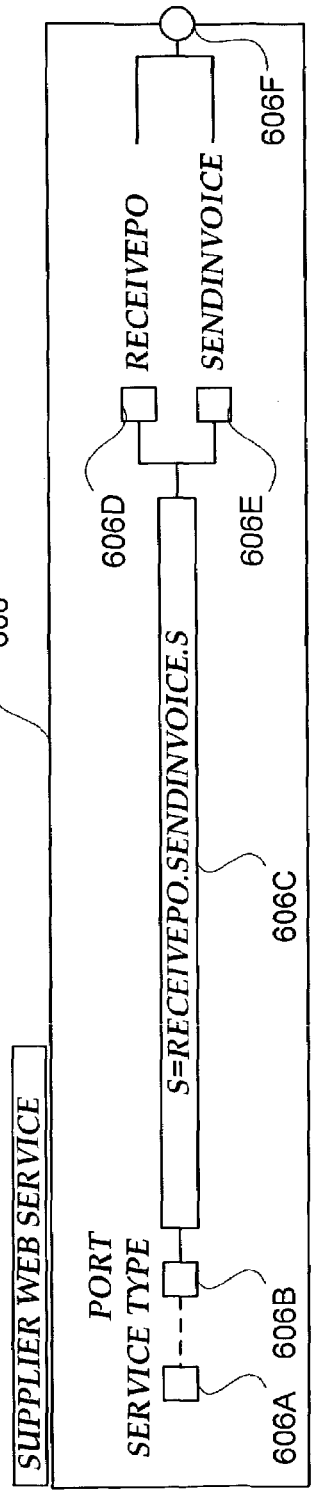
*Fig.6C.*
*Fig.6B.*

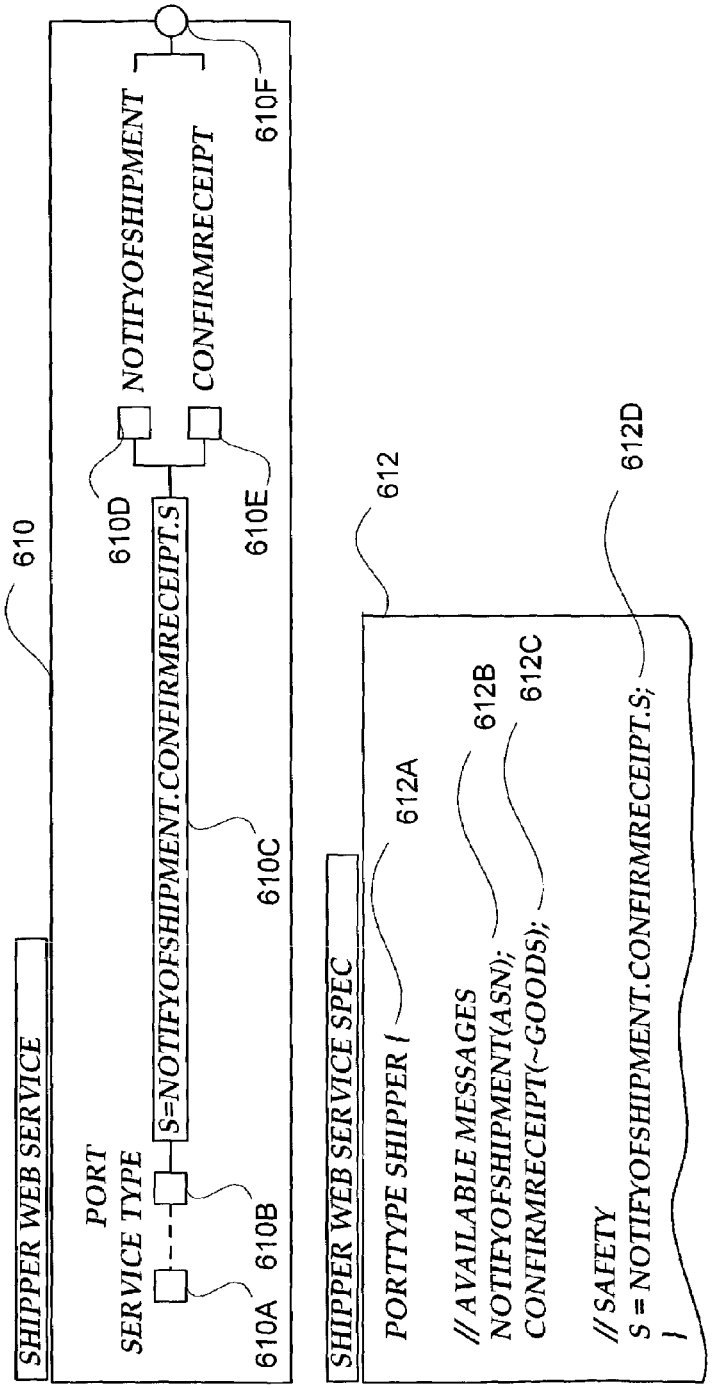

TYPE CHECKING FOR SAFE INTEROPERABILITY AMONG WEB PROCESSES

CROSS-REFERENCE TO A RELATED APPLICATION

This application is a continuation-in-part of prior patent application Ser. No. 10/262,551, filed Sep. 30, 2002 now abandoned.

FIELD OF THE INVENTION

The present invention relates generally to Web services, and more particularly, to type checking for interoperability among Web services.

BACKGROUND OF THE INVENTION

Web services are the fundamental building blocks in the movement toward distributed computing on the Internet. Open standards and the focus on communication and collaboration among software applications have created an environment where Web services are becoming the platform of choice for application integration. Applications are constructed using multiple Web services from various sources that work together regardless of where they reside or how they are implemented. Web services represent black-box functionality that can be used or reused without the need to know the inner working of Web services. One of the primary advantages of Web services' architecture is that the architecture allows Web services written in different languages on different platforms to communicate with each other with ease via messages. Moreover, a significant number of corporations and companies already have a Web infrastructure and personnel with deep knowledge and experience in maintaining such an infrastructure, thereby allowing more fluid adoption of Web services as a platform for future applications.

Examples of Web services include information sources that one could easily incorporate into applications, such as stock quotes, weather forecasts, sports scores, etc. Beyond information sources, one can imagine a whole class of applications that can be built from Web services to analyze and aggregate information desired by interested persons, and present the information to the interested persons. For example, consider a spreadsheet that summarizes a person's whole financial picture: stocks, 401K, bank accounts, loans, etc. If this information were available through Web services, a spreadsheet application could update the information continuously. While most pieces of information may be available now on the Web in a mixture of incongruous, haphazard elements, Web services make programmatic access to all pieces of information easier and more reliable.

Web services are diverse, but almost all of them have three things in common: (1) Web services expose useful functionality to users via a set of interfaces through a standard protocol, such as Simple Object Access Protocol (SOAP); (2) Web services describe the set of interfaces in a document called a contract using Web Services Description Language (WSDL), which is written in enough detail to allow users to build client applications to talk to Web services; and (3) Web services are registered so that potential users can find Web services easily using Universal Discovery Description and Integration (UDDI). In other words, a Web service is a piece of software exposed on the Web through a particular protocol, described with a particular WSDL contract, and registered in a parcticular location in the UDDI.

As discussed above, a WSDL contract describes interfaces of Web services in enough detail to allow a user to build a client application. More particularly, a WSDL contract is a document that describes a set of messages written in a particular protocol and how these messages are to be exchanged. In other words, a WSDL contract describes a Web service interface in terms of messages the Web service can generate and accept. WSDL contracts are readable and editable, but in most cases, WSDL contracts are intended to be produced and consumed by software.

To see the value of WSDL contracts, consider a user who desires to call a method in a Web service that is provided by one of the user's business partners. The user can obtain from the business partner some sample messages generated and accepted by the method. Then the user can proceed to write an application to produce and consume messages that look like the given sample messages. This technique is fraught with errors, however. For example, the user might see a customer identification "2837" in a message and assume that the identification is an integer when, in fact, it is a string. WSDL contracts specify what a request message must contain and what the response message will look like in an unambiguous notation.

The notation that WSDL contracts use to describe message formats is based-on the XML Schema standard, which is not dependent on any particular programming language, and is suitable for describing Web services interfaces that can be accessible from a wide variety of platforms and programming languages. In addition to describing message content, WSDL contracts define where the service is available and what communications protocol can be used to talk to the service. Thus, a WSDL contract should define everything that is required to write an application to work with a Web service.

Unfortunately, WSDL contracts lack the expressive power to define precisely how an application is to interact with a Web service. Although the term "contract" means a binding agreement between two software entities, an application that is interacting with a Web service is free to ignore the terms of a WSDL contract. Thus, a WSDL contract appears as nothing more than a paper tiger. A system 100 shown in FIG. 1 illustrates this problem in greater detail.

The system 100 includes a client 102, which is a computer that accesses shared network resources being provided by another computer, such as a server 106, on a local area network or wide area network such as the Internet 104. A number of Web services 108, 110, are statically stored on the client 102 and the server 106. Web services 108, 110 are composed of programs 108A, 110A, and WSDL contracts 108B-110B.

Each WSDL contract can be divided into two major sections. The first section contains abstract definitions and the second section contains concrete descriptions. The abstract definitions define contractual elements in a platform-independent and language-independent manner. The abstract definitions do not contain machine-specific or language-specific elements. This helps define a set of services that several diverse Web sites can implement. Site-specific elements, such as data serialization, are relegated to the concrete descriptions. Abstract definitions include definitions for types, messages, and porttypes. The concrete descriptions specify bindings and services. The types section declares data types used in a WSDL contract. The messages section defines parameters to operations (i.e., methods). The porttypes section defines one or more operations that can be invoked by applications (and other Web services) external to a Web service described by a WSDL contract. The bindings section can have one or more binding elements whose purpose is to specify how each call and response to an operation is sent or received over the network 104 in accordance with a protocol. The services section has one or more service elements, each of which contains port elements, and each of which in turn refers to a binding element in the bindings section.

Structure 112 illustrates the relationship among contractual elements of the contract 108B and is shown in block diagram form. A porttype 112D declares a number of operation elements. Operation elements within a porttype define the syntax for calling all methods declared in a porttype, such as a prepare operation 112E, a "do work" operation 112F, and a "clean up" operation 112G. Thus, each operation element in a porttype defines the name of the method, the parameters (using messages), and the type of each parameter. There can be several porttypes within a WSDL contract. Each porttype groups together a number of related operations.

A binding element 112C specifies the protocol, serialization, and encoding to be used for each operation 112E-112G of the porttype 112D. A port element 112B associates an Internet location with the binding 112C in a one-to-one correspondence via the use of a Uniform Resource Locator (URL). A service element 112A contains a set of port elements, such as the port 112B. There can be more than one service element in a WSDL contract. Each service element can be used to group together ports according to a URL destination. For example, a developer can redirect all service requests simply by using another service element, and external Web services can still interact with a Web service. Another use of the service element is to classify the ports according to an underlying protocol. For example, a developer can put all HTTP ports in one service element and all SMTP ports in another. An external Web service can then search the WSDL contract 108B for the service that matches the protocol that it can deal with.

As indicated above, the WSDL contract 108B includes several operations, such as the "prepare" operation 112E, the "do work" operation 112F, and the "clean up" operation 112G, which can be invoked to access the services provided by the Web service 108. However, the "prepare" operation 112E should be invoked before the "do work" operation 112F, and the "do work" operation 112F should be invoked before the invocation of the "clean up" operation 112G. Prior WSDL contracts lack the expressiveness power to communicate this ordering information to other Web services, such as the Web service 110, that may desire the services of the Web service 108. For example, the Web service 110 may choose to initially call the "clean up" operation 112G instead of first invoking the prepare operation 112E. This could be catastrophic to the working of the Web service 108 in that it may corrupt the internal execution state of the Web service 108. Moreover, suppose that the Web service 110 is malicious. In this case, the Web service 110 can exploit this weakness of the Web service 108 by calling operations 112E-112G out of sequence simply to wreak havoc with the proper operation of the Web service 108. If Web services can be inappropriately exploited in this fashion, trustworthiness of Web services will be questioned and their use will be diminished and eventually extinguished from the marketplace.

Thus, there is a need for better methods and systems for allowing Web services to safely interact with other Web services while avoiding or reducing the foregoing and other problems associated with existing Web services.

SUMMARY OF THE INVENTION

In accordance with this invention, a method form of the invention is a computer-implementable method for checking the compatibility of a first porttype of a first Web service and a second porttype of the second Web service. The method comprises extracting a first safety from the first porttype of the first Web service and a second safety from the second porttype of the second Web service. The method further comprises testing the compatibility of the first safety with the second safety by binding the first safety with the second safety to determine whether the result of the binding produces interoperability between Web services.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 3A-3C are block diagrams illustrating the creation of a specification for a Web service that contains safeties to define the order in which operations of a Web service are to be invoked;

FIGS. 5A-5C are block diagrams illustrating the safe interoperability of two Web services when their ports have been fused pursuant to the formation of a virtual contract between the two Web services;

FIGS. 6A-6I are diagrams illustrating the creation of a virtual contract for safe interoperability among three Web services, each Web service providing a service or resource to another Web service in the virtual contract;

DETAILED DESCRIPTION OF THE PREFERRED EMBODIMENT

Figure 1:
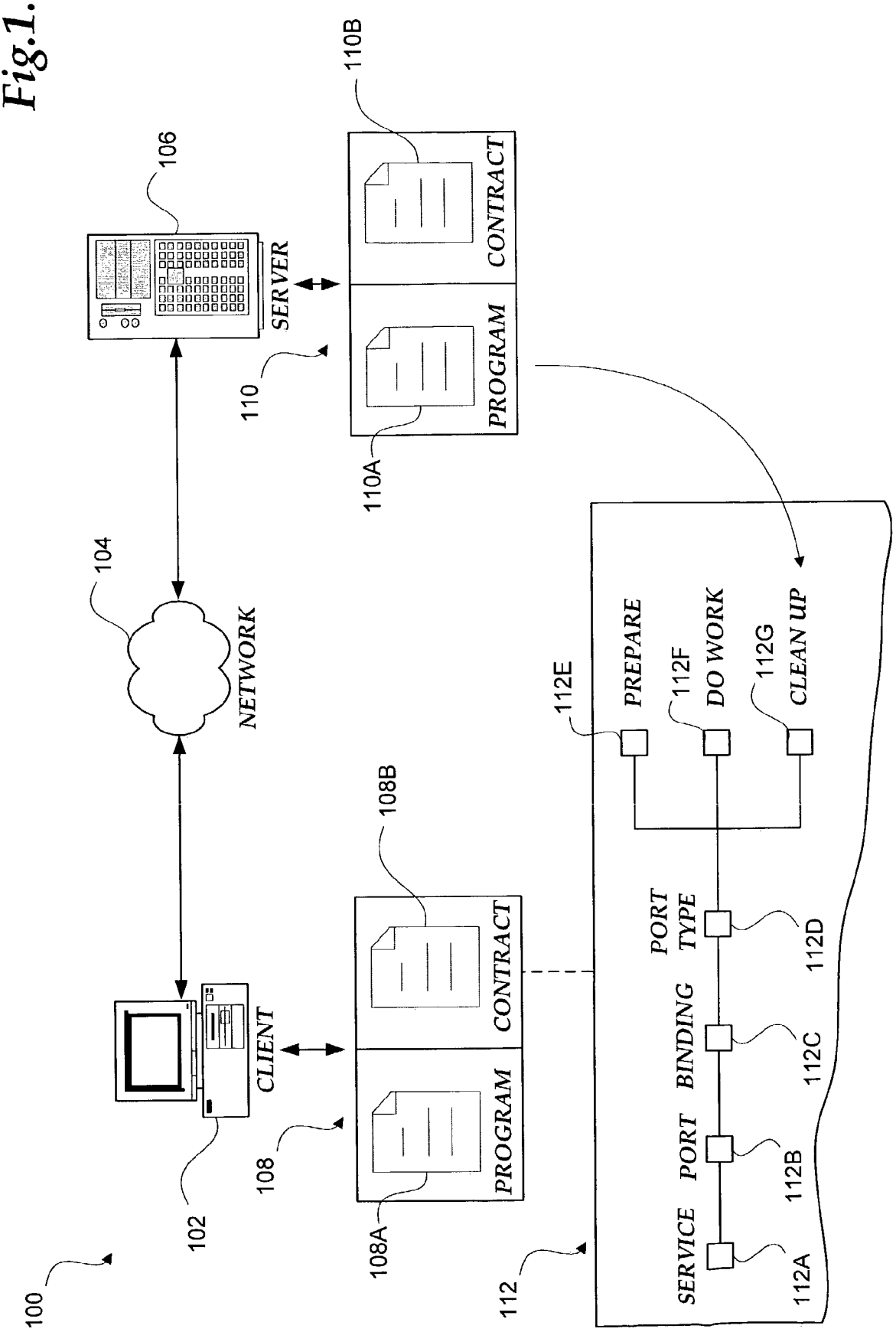
FIG. 1 is a block diagram illustrating a conventional Web services system.
Figure 2:
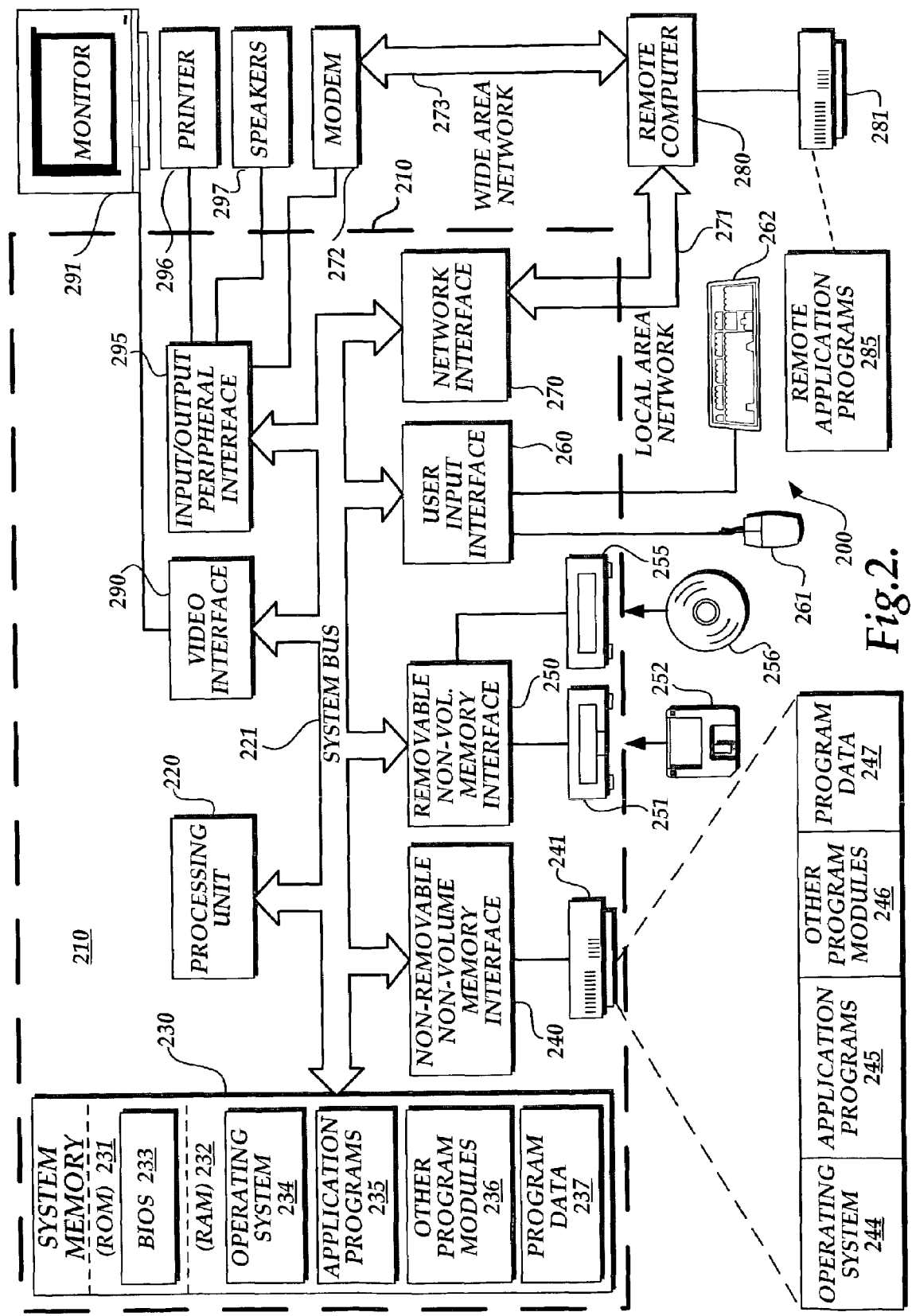
FIG. 2 is a block diagram illustrating an exemplary computing device.

FIG. 2 illustrates an example of a computing system environment 200 suitable for practicing certain aspects of the invention, such as executing programs of Web services and verifying the specifications of Web services for safe interoperability. The computing system environment 200 is only one example of a suitable computing environment and is not intended to suggest any limitation as to the scope of use or functionality of the invention. Neither should the computing environment 200 be interpreted as having any dependency or requirement relating to any one or combination of the illustrated and described components.

The invention is operational with numerous other general purpose or special purpose computing system environments or configurations. Examples of well-known computing systems, environments and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention is described in the general context of computer-executable instructions, such as program modules being executed by a computer. Generally, program modules include routines, programs, objects, components, data structures, etc. that perform particular tasks or implement particular abstract data types.

The invention may also be practiced in distributed computing environments where tasks are performed by remote processing devices that are linked through a communications network. In a distributed computing environment, program modules may be located in both local and remote computer storage media, including memory storage devices.

The computing system environment illustrated in FIG. 2 includes a general purpose computing device in the form of a computer 210. Components of computer 210 may include, but are not limited to, a processing unit 220, a system memory 230, and a system bus 221 that couples various system components including the system memory to the processing unit 220. The system bus 221 may be any of several types of bus structures, including a memory bus or memory controller, a peripheral bus, and a local bus using any of a variety of bus architectures. By way of example, and not limitation, such bus architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

Computer 210 typically includes a variety of computer-readable media. Computer-readable media can be any available media that can be accessed by computer 210 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information, such as computer-readable instructions, data structures, program modules, or other data. Computer storage media include, but is not limited to, RAM, ROM, EEPROM, flash memory or other memory technology, CD-ROM, digital versatile disks (DVD) or other optical disk storage, magnetic cassettes, magnetic tapes, magnetic disk storage or other magnetic storage devices, or any other computer storage media. Communication media typically embody computer-readable instructions, data structures, program modules or other data in a modulated data signal, such as a carrier wave or other transport mechanism that includes any information delivery media. The term "modulated data signal" means a signal that has one or more of its characteristics set or changed in such a manner as to encode information in the signal. By way of example, and not limitation, communication media include wired media, such as a wired network or direct-wired connection, and wireless media, such as acoustic, RF infrared, and other wireless media. A combination of any of the above should also be included within the scope of computer-readable media.

The system memory 230 includes computer storage media in the form of volatile and/or nonvolatile memory, such as read only memory (ROM)231 and random access memory (RAM) 232. A basic input/output system 233 (BIOS), containing the basic routines that help to transfer information between elements within computer 210, such as during start-up is typically stored in ROM 231. RAM 232 typically contains data and/or program modules that are immediately accessible and/or presently being operated on by processing unit 220. By way of example, and not limitation, FIG. 2 illustrates operating system 234, application programs 235, other program modules 236, and program data 237.

The computer 210 may also include other removable/non-removable, volatile/nonvolatile computer storage media. By way of example only, FIG. 2 illustrates the hard disk drive 241 that reads from or writes to non-removable, nonvolatile magnetic media, the magnetic disk drive 251 that reads from or writes to a removable, nonvolatile magnetic disk 252, and an optical disk drive 255 that reads from or writes to a removable, nonvolatile optical disk 256, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital videotapes, solid state RAM, solid state ROM, and the like. The hard disk drive 241 is typically connected to the system bus 221 through a non-removable memory interface, such as interface 240, and the magnetic disk drive 251 and optical disk drive 255 are typically connected to the system bus 221 by a removable memory interface, such as interface 250.

The drives and their associated computer storage media discussed above and illustrated in FIG. 2 provide storage of computer-readable instructions, data structures, program modules and other data for the computer 210. In FIG. 2, for example, hard disk drive 241 is illustrated as storing operating system 244, application programs 245, other program modules 246, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies. A user may enter commands and information into the computer 210 through input devices, such as a keyboard 262 and pointing device 261, the latter of which is commonly referred to as a mouse, trackball, or touch pad. Other input devices (not shown) may include a microphone, joystick, game pad, satellite dish, scanner, or the like. These and other input devices are often connected to the processing unit 220 through a user input interface 260 that is coupled to the system bus, but may be connected by other interface and bus structures, such as a parallel port, game port, or universal serial bus (USB). A monitor 291 or other type of display device is also connected to the system bus 221 via an interface, such as a video interface 290. In addition to the monitor, computers may also include other peripheral output devices, such as speakers 297 and printer 296, which may be connected through an input/output peripheral interface 295.

The computer 210 may operate in a networked environment using logical connections to one or more remote computers, such as a remote computer 280. The remote computer 280 may be a personal computer, a server, a router, a network PC, a peer device, or other common network node, and typically includes many or all of the elements described above relative to the computer 210, although only a memory storage device 281 has been illustrated in FIG. 2. The logical connections depicted in FIG. 2 include a local area network (LAN) 271 and a wide area network (WAN) 273, but may also include other networks. Such network environments are commonplace in offices, enterprise-wide computer networks, intranets, and the Internet.

When used in a LAN networking environment, the computer 210 is connected to the LAN 271 through a network interface or adapter 270. When used in a WAN networking environment, the computer 210 typically includes a modem 272 or other means for establishing communications over the WAN 273, such as the Internet. The modem 272, which may be internal or external, may be connected to the system bus 221 via the input/output peripheral interface 295, or other appropriate mechanism. In a networked environment, program modules depicted relative to the computer 210, or portions thereof, may be stored in the remote memory storage device. By way of example, and not limitation, FIG. 2 illustrates remote application programs 285 as residing on memory device 281. It will be appreciated that the network connections shown are for illustrative purposes only and other means of establishing a communication link between the computers may be used.

FIG. 3B illustrates a Web service 300 that includes a program 300A, which is a sequence of instructions of the Web service 300 that can be executed by a computing device, and a specification 300B (shown as "spec" in the drawings), which is a description of the interfaces of the Web service 300. The specification 300B, unlike a WSDL contract, contains safety rules (hereinafter "safeties") that describe an order in which external Web services can invoke the operations of the Web service 300. In other words, each safety describes the allowable or permissible invocation permutations of the operations of the Web service 300 with which external Web services can call to access the services offered by the Web service 300. If these safeties are not acceptable to an external Web service who is desirous of using the services of the, Web service 300, no virtual contract will be formed. Otherwise, if the safeties are acceptable to the external Web service, a virtual contract will be formed, and safe interoperability between the external Web service and the Web service 300 is possible.

A block diagram that illustrates the structure 302 of the Web service 300 is shown in FIG. 3A. A service element 302A taxonomically differentiates other services described by the specification 300B by grouping together a set of ports (not shown). Each port is associated with a porttype. The structure 302 has a porttype 302B. The porttype 302B declares a number of operations, such as a prepare operation 302D, a dowork operation 302E, and a cleanup operation 302F. For clarity purposes, the following terms are used as follows in the discussion below: the term "operation" is used interchangeably with the term "message" (in contrast, the term "message" in a WSDL contract means only an argument to an operation); the term "parameter" is used to denote an argument to an operation; and the term "binding" is used to mean a programmatic relationship between two safeties, which are explained below (in contrast, the term "binding" in a WSDL contract means an association of a porttype with a particular transfer protocol).

The order in which operations 302D-302F are to be invoked is specified by safeties 302C which have the following forms: (1) S=prepare.SW; and (2) SW=(dowork).SW+ (cleanup). The safeties 302C are textually expressed by a portion 304 of the specification 300B. See FIG. 3C. Line 304A contains the keyword porttype, which declares the commencement of a definition for a porttype; a designator "start_work_stop", which is the name of the porttype; and an open curly bracket "{", which has a matching closed curly bracket "}" to delimit a block of text that programmatically defines the porttype. Line 304B declares the prepare operation 302D, which takes a string as a parameter. Line 304C declares a dowork operation 302E as well as its parameter, a string. Line 304C declares a cleanup operation 302F that has a string parameter.

These operations declared on lines 304B-304D are the operations available to an external Web service for it to access the services of the Web service 300. For some Web services, operations should be invoked in a particular order for proper interoperability with these Web services. For example, in the Web service 300, the prepare operation 302D should be called before the dowork operation 302E, and the dowork operation 302E should be called before the invocation of the cleanup operation 302F. To allow this ordering information to be conveyed, one or more safeties can be formed in accordance with this invention. See lines 304E, 304F. Permutational nuances of a safety can be expressed using the human-readable syntax 400 shown in FIG. 4 (described below) or the model syntax 702 shown in FIG. 7A (described below).

The safeties on lines 304E, 304F is expressed as two sentences: (1) S=prepare.SW; and (2) SW=(dowork).SW+ (cleanup). The letter S is the name of the first safety and the letter SW is the name of the second safety. Each equal sign "=" indicates that the safety is equated to a rule on the right-hand side of the equal sign "=". Preceding the period of the safety S is the prepare operation 302D indicating that the prepare operation 302D is to be invoked first after which the safety SW is in force. The period "." after the dowork operation 302E but before the safety SW indicates that the dowork operation 302E is invoked after which a recursion of the safety SW can occur. In other words, the phrase ".SW" following the dowork operation 302E indicates that zero or more invocations of the dowork operation 302E may be possible. The plus sign "+" indicates that either the dowork operation 302E or the cleanup operation 302F may be invoked following the invocation of the prepare operation 302D. The cleanup operation 302F placed last in the sentence of the safety SW indicates that the cleanup operation 302F should be called last or invoked by an external Web service using the services of the Web service 300. Each semicolon ";" following safeties S and SW indicates the termination of the sentence of the safeties on lines 304E, 304F.

Figure 4:
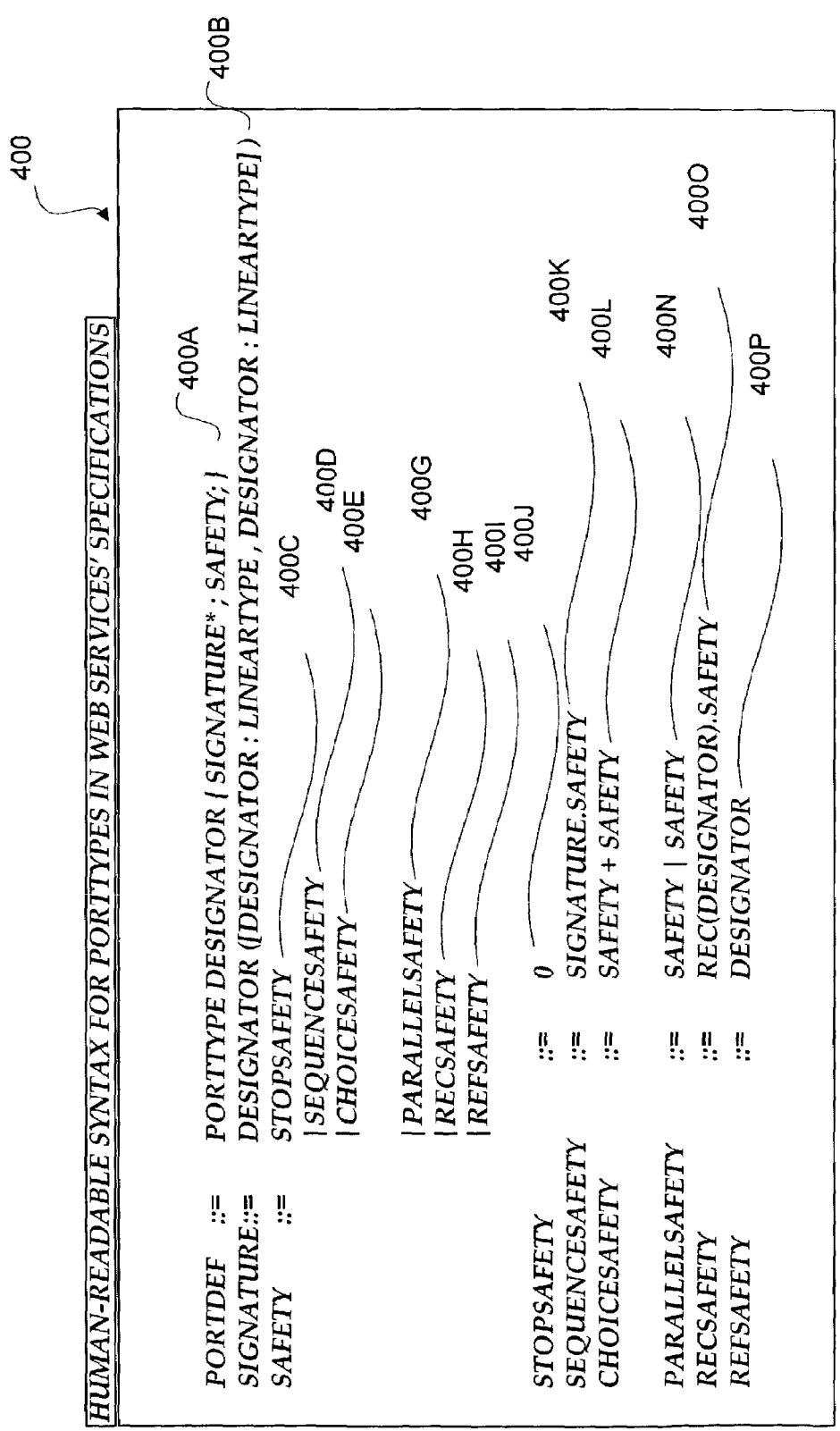
FIG. 4 is a textual diagram illustrating syntaxes of an exemplary programming language, which is an artificial language that can be used to define a sequence of instructions that can ultimately be processed and executed for expressing safeties used in interoperability agreements among Web services.

Porttypes and safeties can be expressed using the human-readable syntax 400 illustrated in FIG. 4 (after which they can be preferably placed in a specification of a Web service, such as the specification 300B). Line 400A contains a definition for a port: porttype designator {signature*; safety;}, where porttype is a keyword declaring the commencement of the definition of a porttype; designator is an identifier of the porttype; the pair of open and closed curly brackets delimit expressions that define the porttype; and safety indicates rules that define the order in which to invoke the operations described by the signatures. Each signature (there can be more than one, which is signified by the asterisk symbol "*") has the syntactical expression "designator ([designator:lineartype,designator:lineartype])" shown on line 400B, where the first designator is the identifier of a particular operation; the second and third designators bound by the pair of parentheses indicate identifiers of parameters of the operation; and the two linear types define the data type of each parameter (for brevity purposes, only two parameter slots are defined for the signature on line 400B, but more than two are possible); the colon indicates that the designator of a parameter on the left-hand side of the colon has the data type declared on the right-hand side of the colon; the comma "," delimits one parameter from another parameter; and the pair of parentheses "( )" delimit the parameters and their types used by the operation.

Lines 400C-400I define various types of safeties. A stop safety is declared on line 400C. A stop safety denotes inactivity or termination of a safety. A sequence safety declared on line 400D defines an order in which to invoke an operation or a message of a Web service. A choice safety declared on lines 400E denotes alternatives that can be chosen in a safety. On line 400G, a parallel safety is defined to denote concurrent, distributed processing of two safeties. A recursion safety, which defines a variable whose use is recursive in a safety, is declared on line 400H. A reference safety declared on line 400I denotes that a safety can be given a name to be used in combination with other safeties. Line 400J shows that the stop safety is composed of the symbol zero "0". The sequence safety is composed of a signature of a function followed by a period ".", which is then followed by another safety. See line 400K. The choice safety is composed of two safeties separated by a plus sign "+" (see line 400L). The parallel safety defined on line 400N is composed of two safeties separated by a vertical sign "|". The recursion safety is composed of a keyword "rec" followed by a pair of parentheses, which bound a designator, and is followed by a period and another safety rule. See line 400O. Using the recursion safety, safeties (S=prepare.SW; SW=(dowork).SW+(cleanup)) can be equivalently written as a safety (prepare.rec(SW).((dowork) .SW+(cleanup))). Line 400P indicates that a reference safety is simply a designator, which is a name or an identifier.

Using the human-readable syntax 400, expressive nuances of safeties can be specified to enhance safe interoperability among Web services. Each safety is preferably placed in a porttype definition in a Web service's specification. The human-readable syntax 400 is illustrated here for ease of discussion in figures following FIG. 4. A more restrained, but equally expressive is the model syntax 702 illustrated in FIG. 7A (described below). Both the human-readable syntax and the model syntax 702 can be formed using a suitable customizable, tag-based language. Any suitable customizable, tag-based language can be used. One suitable language includes the XML Schema language. By using a customizable, tag-based language, safeties formed in accordance with this invention can be fitted into existing porttype definitions of WSDL contracts.

A fileserver Web service 502 is shown at FIG. 5A in block diagram form. The fileserver Web service provides file storage services for other Web services on the network. Unlike a disk server, the filerserver Web service 502 not only stores files but manages them and maintains order as other Web services request files and make changes to them. To deal with the tasks of handling multiple (sometimes simultaneous) requests for files, the Web service 502 interacts with processors and controlling software as well as disk drives for storage.

The fileserver Web service 502 includes a service element 502A, and a porttype 502B, among other elements (not shown). The porttype 502B defines a number of operations, such as an open operation 502D, a read operation 502E, a write operation 502F, and a close operation 502G. These operations 502D-502G are further defined in a portion 504 of a fileserver Web service's specification. See FIG. 5B. The porttype 502B also defines safeties 502C, which specify the order with which external Web services access the services offered by the fileserver Web service 502D via operations 502D-502G. The safeties 502C are further defined in the portion 504. See lines 504F, 504G. A port 502H of the fileserver Web service 502 allows other Web services to fuse (described in detail below) in order to access the services of the fileserver Web service 502B by invoking operations 502D-502G.

The portion 504 focuses on one porttype definition among many porttypes of the fileserver Web service's specification. Line 504A contains the keyword porttype followed by the designator "fileserver", and a pair of open and closed curly brackets for delimiting the definition of the fileserver porttype 502B. Line 504B declares the signature of the open operation 502D that takes a file name as a parameter. In all cases, to use the services of the fileserver Web service 502, external services specify the name of the file to be opened via the open operation 502D. Thus, the open operation 502D should be the first operation that is invoked by external Web services for each particular file server session. The read operation 502E is declared on line 504C. The read operation takes a client's port as a parameter. When the read operation 502E is invoked by external Web services, the fileserver Web service 502 reads a chunk of data from an opened file, and transmits the read data toward the given client's port. External Web services can also write information to opened files via the write operation 502F, which is declared on line 504D. The write operation takes data as a parameter. This data is written by the write operation to the opened file. When all desired operations have been carried out on the opened file, the opened file can be closed via the close operation 502G, which is declared on line 504E. The close operation 502G takes a file name as an argument so that the close operation 502G knows which file to close.

Lines 504F-504G contain the safeties of the fileserver porttype 502B. Line 504F contains a safety sentence: S=open.Srw, where S is a safety rule; open denotes that the open operation 502D is the first operation to be invoked in a file server session; the period "." denotes that additional safeties are to follow the invocation of the open operation 502D; Srw refers to a second safety defined further on line 504G. Line 504G contains the following safety sentence: Srw=read.Srw+write.Srw+close, where Srw denotes the second safety; read.Srw denotes the invocation of the read operation 502E, which is then followed by the second safety again (a recursion); write.Srw denotes the invocation of the write operation 502F, which is then followed recursively by the second safety; close denotes the invocation of the close operation 502G; and the plus symbol "+" denote choices that external Web services can make to invoke among the read operation 502E, the write operation 502F, or the close operation 502G.

A system 500 shows the interoperability of Web services 502, 508 after a virtual contract has been created. See FIG. 5C. A virtual contract is created when the porttypes of ports 502H, 508A between the Web services 502, 508 are compatible. More particularly, a virtual contract is created when the safeties of the porttypes of ports 502H, 508A are acceptable to both the Web services 502, 508. A virtual contract is not something that physically exists but it is present when the safeties of porttypes align with each other in a way that ensures safe interoperability between Web services 502, 508. For clarity purposes, many elements of the fileserver Web service 502 are not shown in FIG. 5C. The fileserver Web service 502 can be executed on a computing device, such as a cellular phone 506; the client Web service 508 can be executed on a computing device, such as a personal digital assistant 510; and a store Web service 512 can be executed on a computing device, such as a desktop computer 514.

The port 508A of the client Web service 508 is shown to be fused to the port 502H of the fileserver Web service 502. This fusing between the client Web service 508 and the fileserver Web service 502 is possible after the client Web service 508 has shown that it is willing to comply with the safeties of the fileserver porttype 502B. With the fusing of ports 508A-502H, the client Web service 508 can access and invoke operations 502D-5-02G of the fileserver Web service 502 in accordance with and in the manner specified by the safeties of the fileserver porttype.

Suppose that the client Web service 508 has already invoked the open operation 502D to open a file. The client Web service 508 can invoke the read operation 502E to obtain the read data. In the invocation of the read operation 502E, the client Web service 508 provides a port 508B to receive the read data after the invocation of the read operation 502E. The fileserver Web service 502 includes a port 502I for transmitting the read data toward the port 508B. It is not necessary, however, that the port 508B be an actual port at the client Web service 508. The port 508B can be virtually provided by another Web service, such as the store Web service 512. A virtual contract may have been formed between the client Web service 508 and the store Web service 512 to store information in a particular manner desired by the client Web service 508. Instead of providing the port 508B as a parameter to the read operation 502E, the client Web service can provide the port 512A of the store Web service 512 so that the data read by the read operation 502E will be automatically forwarded to the store Web service 512. This can occur unbeknownst to the fileserver Web service 502. Each port is thus a transferable quantity that can be given to a Web service to expand the communication possibilities of a Web service. In this example, the prior scope of the fileserver Web service 502 is limited to the interaction with the client Web service 508 but can later be expanded to include the store Web service 512 when the port 512A is transferred to the fileserver Web service 502 via the client Web service 508.

The joining of Web services, such as the fileserver Web service 502 to the store Web service 512, is accomplished via a virtual contract through the use of safeties formed in accordance with this invention. This joining of Web services heightens the safe interoperability of Web services to create greater functionality than each Web service alone can provide. Moreover, because the joining of Web services is formed programmatically, Web services are more trustworthy, dependable, and available if the safeties of Web services are complied with. The programmatic joining formed in accordance with this invention reduces or eliminates mistakes, lost requests, faults in the face of invalid requests, or corrupt persisted data in the interoperability of Web services.

The discussion above in correction with FIGS. 3A-3C introduces the notion of safeties to a specification of a Web service. Because a porttype contains declarations of operations that external Web services can invoke to access services offered by a desired Web service, safeties are preferably placed inside a porttype. As also discussed above, safeties describe the order with which external Web services must invoke the operations of a desired Web service to obtain desired services. If an external Web service cannot comply with the safeties of another Web service at the outset, there is no binding agreement (a virtual contract) between the two Web services, and the noncomplying Web service cannot invoke the services of the other Web service. One example of a creation of a virtual contract between two Web services is discussed above in connection with FIGS. 5A-5C. Because the client Web service 508 is willing to comply with the safeties of the file server Web service 502, the port 508A of the client Web service 508 can be fused to the port 502H of the file server Web service 502. Such a fusing allows the client Web service 508 to invoke the services of the file server Web service 502 at the port 502H. More particularly, a virtual contract can be created when the porttype of the port 508A of the client Web service 508 is programmatically compatible (or complies with the safeties of) the porttype of the port 502H of the file server Web service 502. Instead of forming a virtual contract between two Web services, the discussion in connection with FIGS. 6A-6I focuses on a binding agreement among three Web services (a purchaser Web service 602, a supplier Web service 606, and a shipper Web service 610) formed in accordance with this invention. However, virtual contracts can be formed without regard to the number of participating Web services as long as each Web service is willing to comply with the safeties of other participating Web services.

The purchaser Web service 602 includes a service element 602A and a porttype element 602B, among other elements (not shown). The porttype 602B includes an initiatepurchase operation 602D, a confirm purchase operation 602E, and a safety 602C that specifies the invocation of operations 602D-602E. The purchaser Web service 602 also includes a port 602F whose data type is the porttype 602B. See FIG. 6A. A portion 604 of the purchaser Web service's specification is illustrated in FIG. 6B. Line 604A contains the keyword porttype; the designator "purchaser" of the porttype; and an open curly bracket "{", which has a companion closed curly bracket to delimit the definition of the purchaser porttype 602B. Line 604B contains a signature for the initiatepurchase operation 602D, which has two parameters. One parameter is a purchase order parameter designated as "PO". The other parameter is an advanced shipping notice "~ASN", where the tilde "~" denotes that the purchaser Web service 602 consumes the data represented by the parameter ASN. Line 604C contains a signature of the confirmpurchase operation 602E, which takes an "invoice" parameter and a "goods" parameter. The invoice parameter is qualified by a tilde "~" to denote that the purchaser Web service 602 consumes the data represented by the invoice parameter. Both the PO parameter and the goods parameter are not qualified by the tilde, hence indicating that the purchaser Web service 602 is the producer or the source of the data represented by these parameters. Line 604D contains a safety for the purchaser porttype. 602B. In brief, the invocation of the initiatepurchase operation 602D must occur before the invocation of the confirmpurchase operation 602E, which is then followed by a recursion of the invocation of operations 602D, 602E.

The supplier Web service 606 is illustrated in block diagram form in FIG. 6C. The supplier Web service 606 includes a service element 606A and a porttype element 606B, among other elements (not shown). The porttype 606B is a data type for a port 606F of the supplier Web service 606. The porttype 606B contains a receivepo operation 606D, a sendinvoice operation 606E, and a safety 606C that specifies the invocation order of operations 606D, 606E. The supplier Web service 606 also includes a port 606F whose data type is the porttype 606B. A portion 608 of the supplier Web service's specification is shown in FIG. 6D. Line 608A contains the declaration of a supplier porttype 606B and includes an open curly bracket "{", which has a companion closed curly bracket to delimit the definition of the supplier porttype 606B. Line 608B contains a signature of the receivepo operation, which takes the purchase order "~PO" as a parameter. The tilde indicates that the supplier Web service 606 consumes the data represented by the purchase order ~PO parameter. Line 608C contains a signature of the sendinvoice operation 606E, which takes the invoice as a parameter. Line 608D contains a safety for the supplier porttype 606B. In brief, the receivepo operation 606D is to be invoked prior to the invocation of the sendinvoice operation 606E, which can then be followed by the recursion of the invocation of operations 606D, 606E.

As shown in FIG. 6E, the shipper Web service 610 includes a service element 610A and a porttype element 610B, among other elements (not shown). The porttype 610B describes the data type of a port 610F of the shipper Web service 610. The porttype 610B includes a notify of shipment operation 610D, a confirm receipt operation 610E, and a safety 610C, which specifies the invocation order of operations 610D, 610E. A portion 612 of the shipper Web service's specification is illustrated in textual form in FIG. 6F. Line 612A contains the declaration of the shipper porttype 610B and an open curly bracket "{", which has a companion closed curly bracket "}" to delimit the definition of the shipper porttype 610B. Line 612B contains a signature of the notify of shipment operation 610D, which takes the advance shipping notice "ASN" as a parameter. Because the advanced shipping notice ASN is not qualified by a tilde, the shipper Web service 610 is a producer or a source of the data represented by the ASN parameter. Line 612C contains a signature of the confirm receipt operation 610E, which takes "~goods" as an argument. The tilde in front of the designator "goods" denotes that the shipper Web service 610 is a consumer of the data represented by the "goods" parameter. Line 612D contains a safety for the shipper porttype 610B. In brief, the invocation of the notify of shipment operation 610D occurs before the invocation of the confirmereceipt operation 610E, and after which, a recursion of the invocation of the operations 610E, 610E may occur.

Figure 6G:
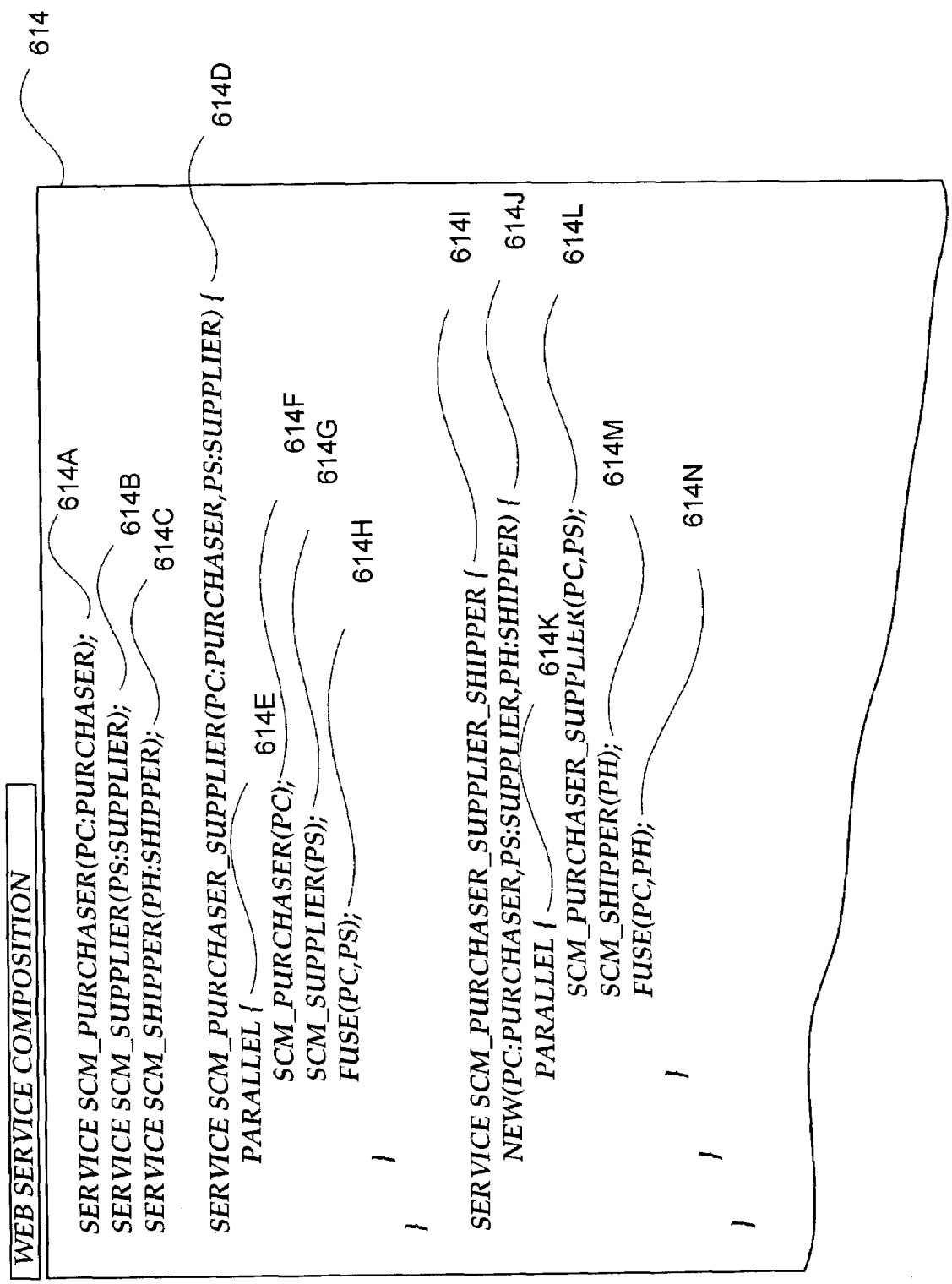

A portion 614 of a program for expressing the composition of the purchaser Web service 602, the supplier Web service 606, and the shipper Web services 610 is shown in FIG. 6G. Line 614A contains a signature of a purchaser Web service 602, which has a port designated as "PC" having the purchaser porttype 602B. Line 614B contains a signature of the supplier Web service 606, which has a port designated as "PS" having the supplier porttype 606B. Line 614C contains a signature for the shipper Web services 610, which has a port designated as "PH" having the shipper porttype 610B.

Line 614I contains the keyword service, which heralds the commencement of the definition of a Web service or a composition of Web services; the designator "scm_purchaser_supplier_shipper", which denotes the name of a composition of Web services 602, 606, and 610; and an open curly bracket "{", which has a companion closed curly bracket "}" to delimit the definition of the composition of Web services. Line 614J contains the keyword new, which defines unique names for ports and associates these ports with particular porttypes: a new port "PC" of the purchaser porttype 6002b; a new port "PS" of the supplier porttype 606B; a new port "PH" of the shipper porttype 610B; and an open curly bracket "{", which has a companion closed curly bracket "}" to delimit the scope of operations for these new ports PC, PS, and PH. Line 614K contains the keyword parallel, which denotes that services and processes expressed between an open curly bracket "{" and a companion closed curly bracket "}" are to be executed in parallel.

Line 614L contains an invocation of another Web service composition called "scm_purchaser_supplier", which takes the ports PC, PS as parameters. Digressing, the definition of the Web service composition "scm_purchaser_supplier" begins at line 614D. Line 614D contains the keyword service indicating that a definition for Web services or composition of Web services is about to commence; the designator scm_purchaser_supplier denotes the name of the Web service composition; the parameter PC, which is a port 602F of the purchaser porttype 602B; a parameter PS, which is the port 610F of the supplier porttype 610B; and an open curly bracket "{", which has a companion closed curly bracket "}" to delimit the definition of the Web service composition scm_purchaser_supplier. Line 614E contains the keyword parallel denoting that Web services and processes defined between its open curly bracket "{" and closed curly bracket "}" are to be executed in parallel. Line 614F invokes the purchaser Web service 602 with a port 602F designated as PC. Line 614G invokes the supplier Web service 606 with the port 606F designated as PS. Line 614H invokes the fusing mechanism formed in accordance with this invention to fuse ports 602F (designated as PC) with ports 606F (designated as PS). Whether ports 602F, 606F can be fused depends on whether the porttype 602B of the purchaser Web service 602 is compatible with a porttype 606B of the supplier Web service 606. More particularly, the fusing of ports 602F, 606F is possible if the safety 602C of the purchaser Web service 602 can be aligned with the safety 606C of the supplier Web service 606 so as to produce an input guarded process. In other words, if the safeties 602C, 606C can be aligned, it is programmatically safe to fuse ports 602F, 606F between the purchaser Web service 602 and the supplier Web service 606. A virtual contract can be created for the safe interoperability between the purchaser Web service 602 and the supplier Web service 606. This is described in detail below in connection with FIGS. 8A-8O.

Returning to the definition of the Web services composition scm_purchaser_supplier_shipper, line 614M contains an invocation of the shipper Web service 610, which takes the port 610F designated as PH as a parameter. Line 614N contains an invocation of the fusing mechanism formed in accordance with this invention between ports 602F (PC) and port 610F (PH). If the fusing between ports cannot be accomplished due to incompatibility between safeties or porttypes, the ports will not be fused.

Figure 6H:
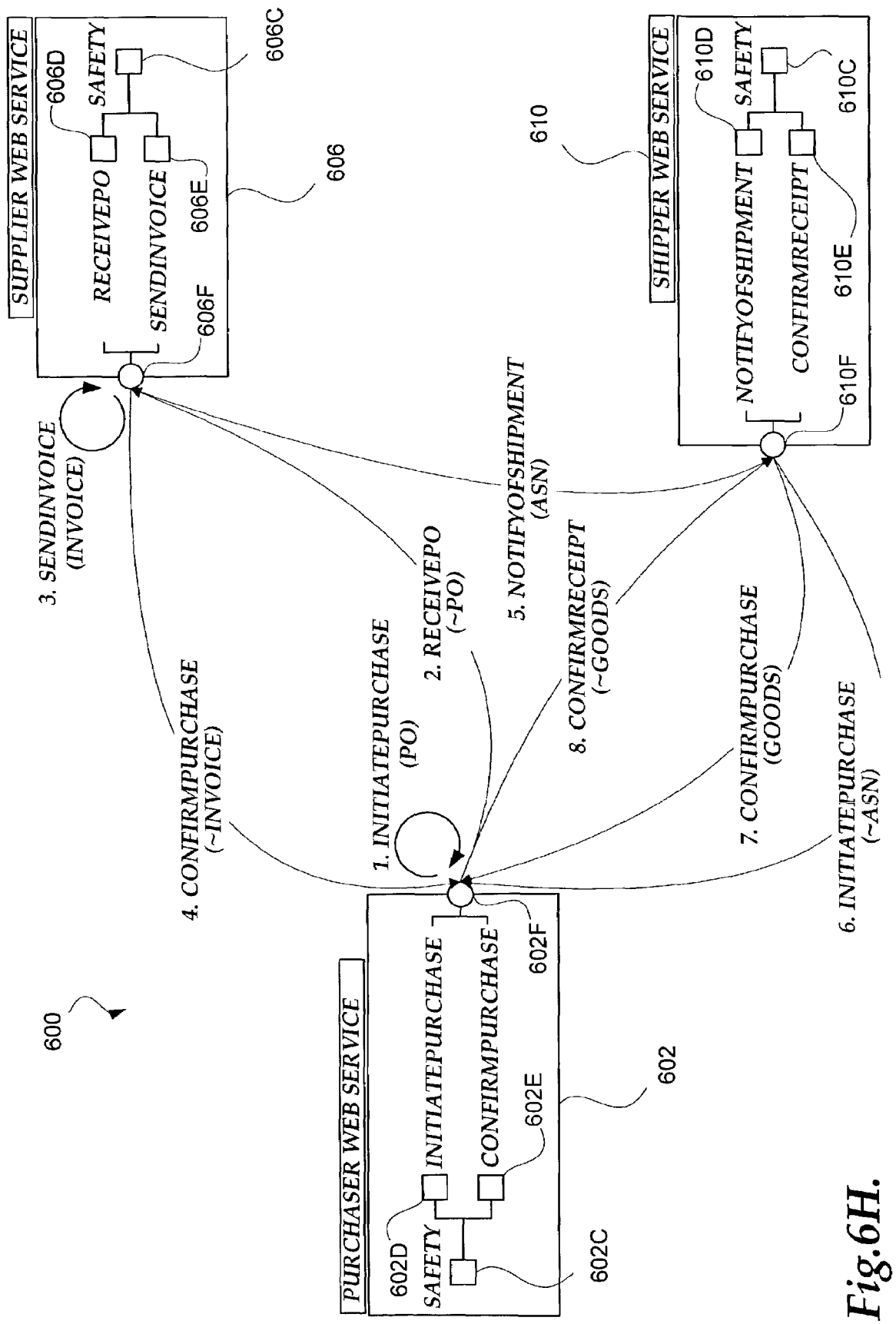
Figure 6I:
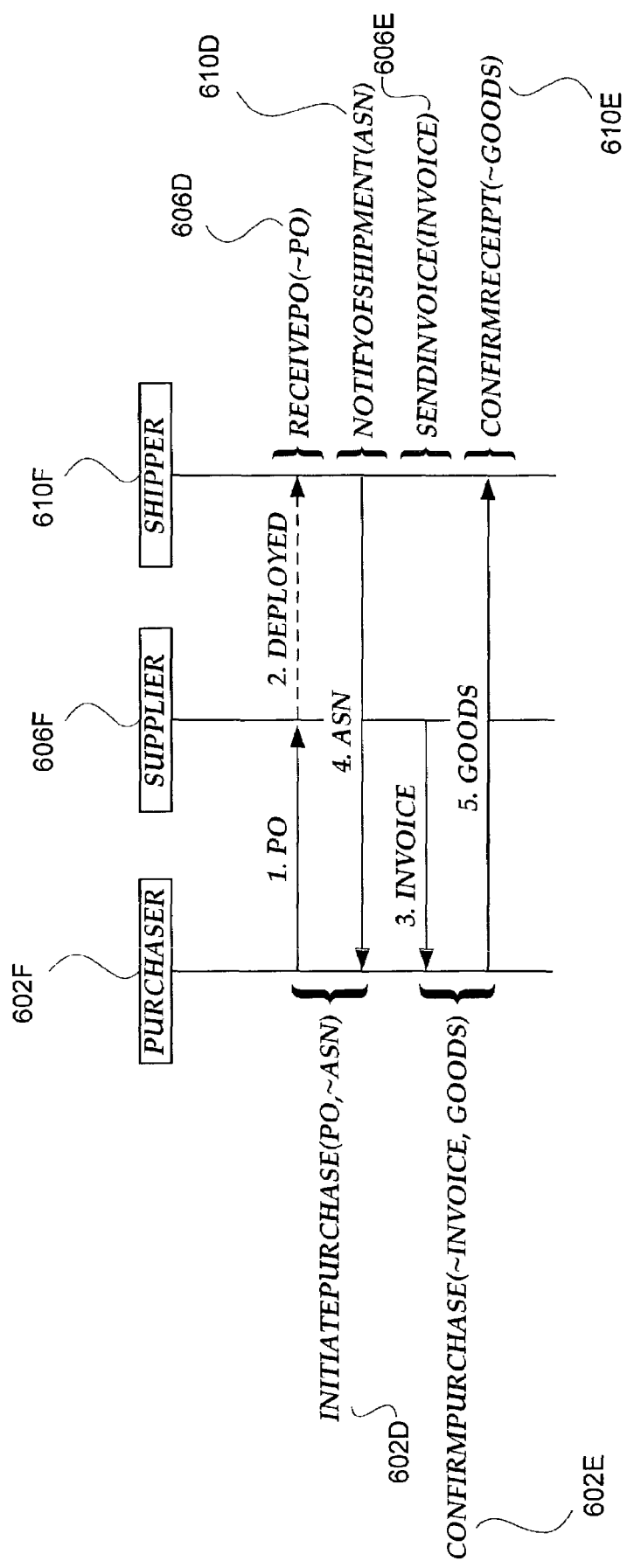

FIG. 6H is a dynamic visual presentation of the invocation of operations in a system 600 that includes the purchaser Web service 602, the supplier Web service 606, and the shipper Web service 610. The system 600 commences execution with the invocation of the initiatepurchase operation 602D and the production of the purchase order (PO). The purchaser Web service 602 then invokes the receivepo operation 606D of the supplier Web service 606, provides the produced purchase order (PO), and the purchase order (~PO) is then consumed by the supplier Web service 606. The sendinvoice operation 606E is then invoked with the production of the invoice. The supplier Web service 606 then invokes the confirmpurchase operation 602E or the purchaser Web service 602, provides the produced invoice (invoice), and the produced invoice (~invoice) is consumed by the purchaser Web service 602. Next, the supplier Web service 606 invokes t he notify of shipment operation 610D of the shipper Web service 610 and provides the advanced shipping notice (ASN). The shipper Web service 610 then provides the advanced shipping notice (ASN) to the purchaser Web service 602 and the purchaser Web service 602 consumes the advanced shipping notice (~ASN). The purchaser Web service 602 next invokes the confirm receipt operation 610E of the shipper Web service 610 and provides the receipt of goods (goods). In turn, the shipper Web service 610 provides the receipt of goods (goods), and the receipt of goods (~goods) is consumed by the purchaser Web service 602.

The foregoing discussion in FIG. 6H illustrates the invocation order specified by the safeties 602C, 606C, 610C. However, the interoperability among Web services 602-610 can be better appreciated by studying the production and the consummation of messages. See FIG. 6I. The system 600 commences when the purchase order (PO) is produced at the port 602F of the purchaser Web service 602 and sent to the port 606F of the supplier Web service 606, where the purchase order (PO) is consumed. The production of the purchase order (PO) is represented by the designator PO without the tilde "~" in the parameter list of the initiatepurchase operation 602D. The consummation of the purchase order (PO) is represented by the receivepo operation 606D with the parameter ~PO. A first process broadly represented by the initiatepurchase operation 602D becomes inactive (due to the safety 602C) because the port 602F has sent the purchase order (PO) but has not received the advanced shipping notice (~ASN). A second process broadly represented by the receivepo operation 606D continues to a third process broadly represented by the sendinvoice operation 606E (due to the safety 606C) because the port 606F has received the purchase order (~PO). With the third process being active, the invoice is produced at the port 606F and is sent to the port 602F of the purchaser Web service 602 where the invoice is consumed. The safety 606C is now satisfied. The production of the invoice is represented by the sendinvoice operation 606E and the consummation of the invoice is represented by the confirmpurchase operations 602E. A fourth process broadly represented by the confirmpurchase operation 602E becomes inactive (due to the safety 602C) because the port 602F has not received the advanced shipping notice (~ASN). Mini communication occurs between the supplier Web service 606 and the shipper Web service 602 once the supplier Web service 606 has received the purchase order (PO) at the port 606F. The advanced shipping notice (ASN) is produced by the shipper Web services 610 at the port 610F and is sent to the port 602F of the purchaser Web service 602 where it is consumed. A fifth process broadly represented by the notify of shipment operation 610D continues on to a sixth process (due to the safety 610C) broadly represented by the confirm receipt operation 610E because the port 610F has sent the advanced shipping notice (ASN), but the sixth process becomes inactive because the port 610F has not received the receipt of goods (~goods). The first process broadly represented by the initiatepurchase operation 602D becomes active and continues to the fourth process (due to the safety 602C) broadly represented by the confirmpurchase operation 602E because the port 602F has received the advanced shipping notice (~ASN). The production of the advanced shipping notice (ASN) is represented by the notify of shipment operation 602D and the consummation of the advanced shipping notice (ASN) is represented by the initiatepurchase operation 602D. The fourth process broadly represented by the confirmpurchase operation 602E becomes active (due to the safety 602C) because the port 602F has received the advanced shipping notice (~ASN). With the activation of the fourth process, the receipt of goods (goods) is produced at the port 602F of the purchaser Web service 602 and is sent to the port 610F of the shipper Web service 610 where it is consumed. The production of the receipt of goods (goods) is represented by the confirmpurchase operation 602E and the consummation of the receipt of goods (goods) is represented by the confirm receipt operation 610E. The safety 602C is satisfied with the production of the receipt of goods (goods). The sixth process broadly represented by the confirm receipt operation 610E becomes active because the port 610F has received the receipt of goods (~goods) and the safety 610C is then satisfied. The hereinabove discussion shows the inherent synchronization (activity and inactivity) of messages and operations when-their processing nuances are expressed using safeties formed in accordance with this invention.

Figure 7A:
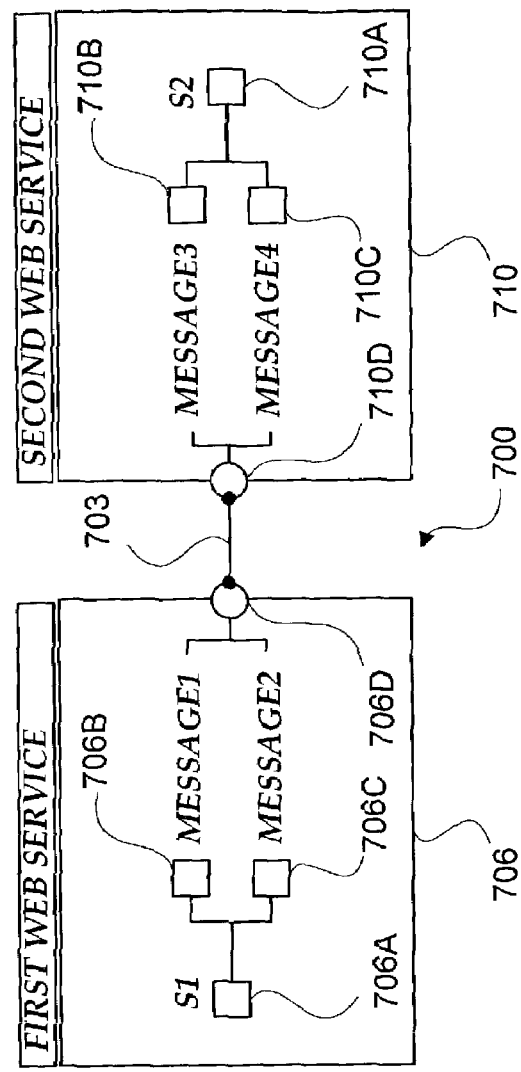
FIGS. 7A-7B are diagrams illustrating syntaxes of another exemplary programming language for forming safeties used in interoperability agreements among Web services.

The model syntax 702 for porttypes is illustrated in FIG. 7A. Various elements of the model syntax 702 are similar to elements of the human-readable syntax 400 (the safety syntactical category described on lines 400C-400P). The letter PT 702E contains a definition for a porttype: porttype name {(M;)* S;}, where porttype is a keyword declaring the commencement of the definition of a porttype; name is an identifier of the porttype; the pair of open and closed curly brackets delimit expressions that define the porttype; the letter M contains a message (described below); and the letter S (described below) indicates one or more safeties. The letter S 702A denotes a named collection of safeties to be defined by various elements of the model syntax 702. The symbol "0" 702B denotes an inactive or a stop safety. The phrase "M.S" 702C denotes a sequence safety, where the letter M denotes a message type 702I, which is followed by another safety 702A. The phrase "$S_0+S_1$" 702D denotes a choice to be made between the execution of the safety $S_0$ or the safety $S_1$. The phrase "$S_0|S_1$" 702F denotes parallel execution of safeties $S_0$ and $S_1$. The phrase "rec(K).S" 702G denotes a recursion of a name K 702J in the safety S. The phrase "K" 702H denotes that the safety 702A can be given a name.

Figure 7B:
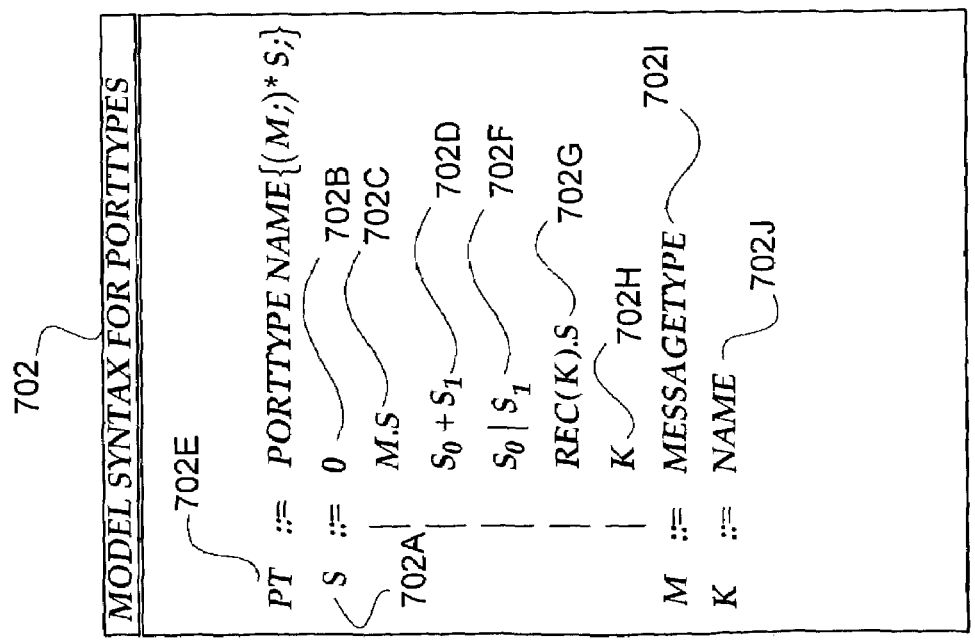

FIG. 7B illustrates a system 700 showing the interoperability between a first Web service 706 and a second Web service 710, the first Web service 706 having a safety S1 706A; a message1 operation 706B; a message2 operation 706C; and a port 706D. The second Web service 710 includes a safety S2 710A; a message3 operation 7101B; a message4 operation 710C; and a port 710D. The first Web service 706 and the second Web service 710 are shown to be fused by the fuse line 703.

Figure 8A:
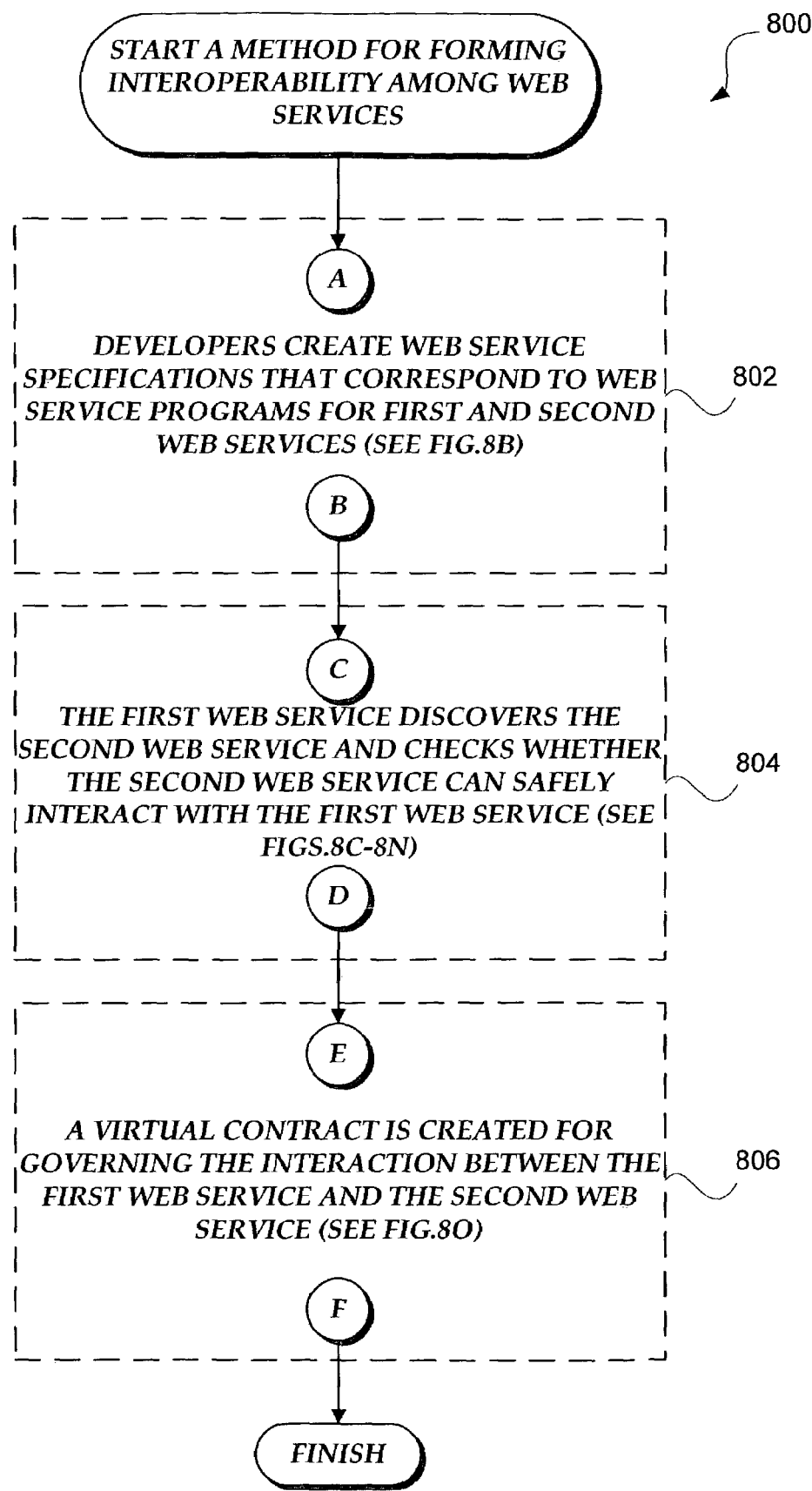
FIGS. 8A-8O are method diagrams illustrating an exemplary method formed in accordance with this invention for verifying the compatibility of porttypes among Web services so as to form safe interoperability among Web services.
Figure 8B:
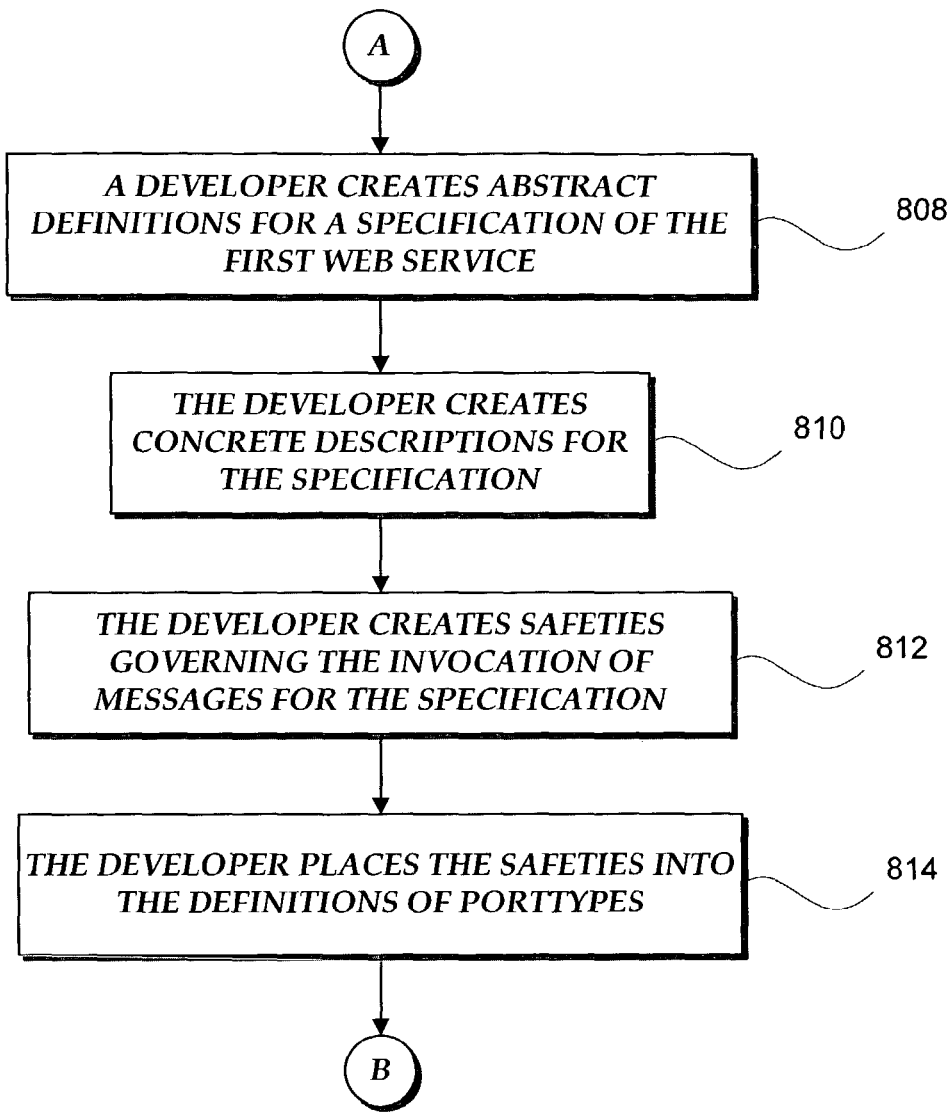
Figure 8C:
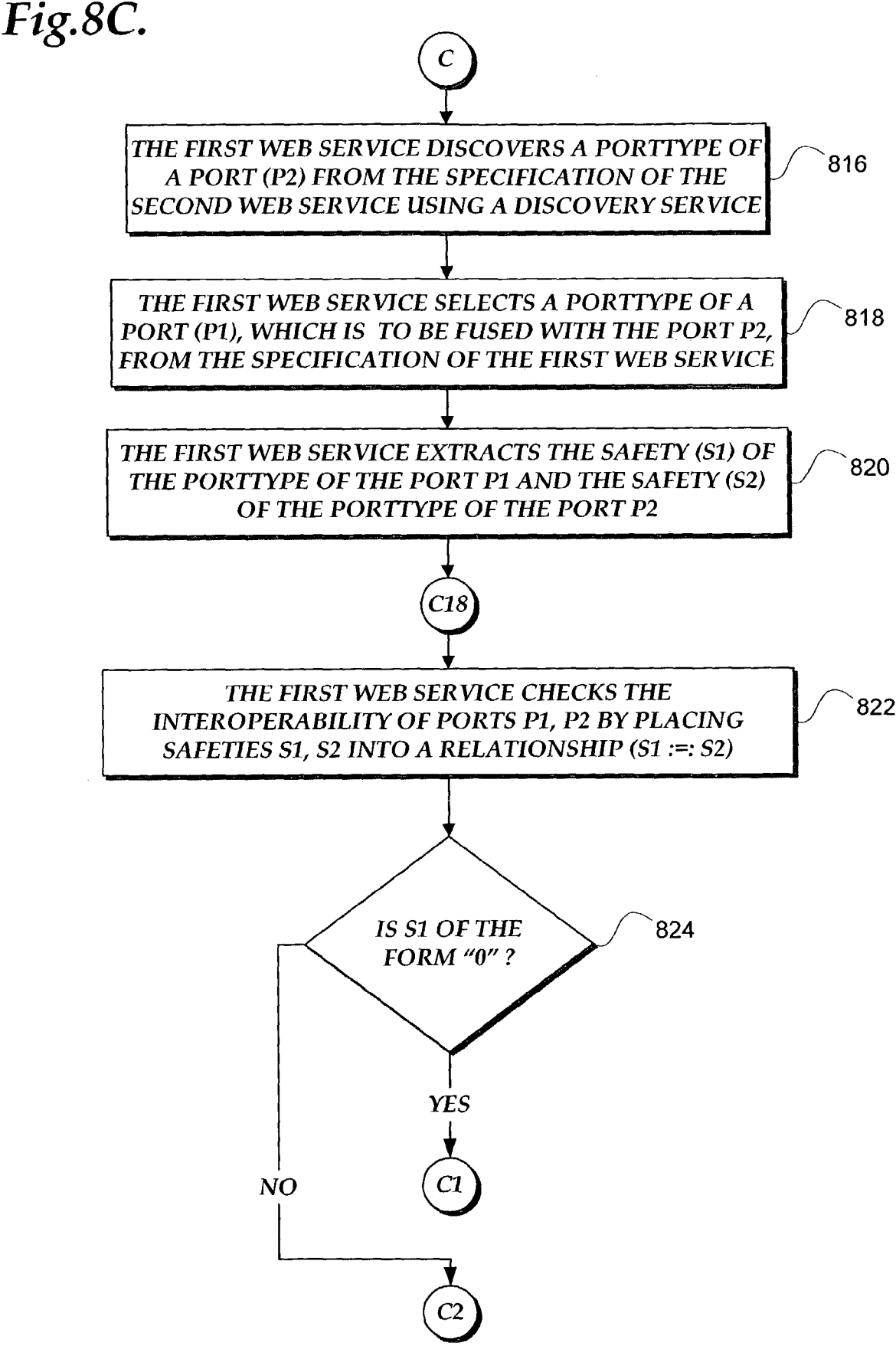
Figure 8D:
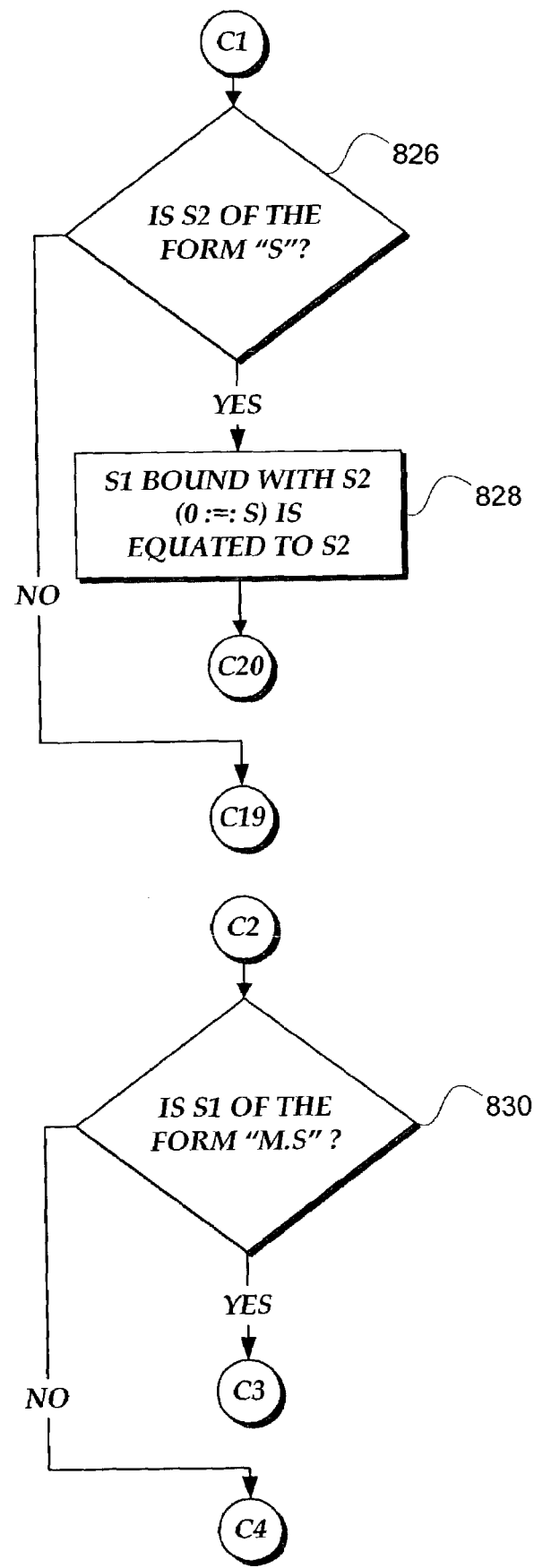
Figure 8E:
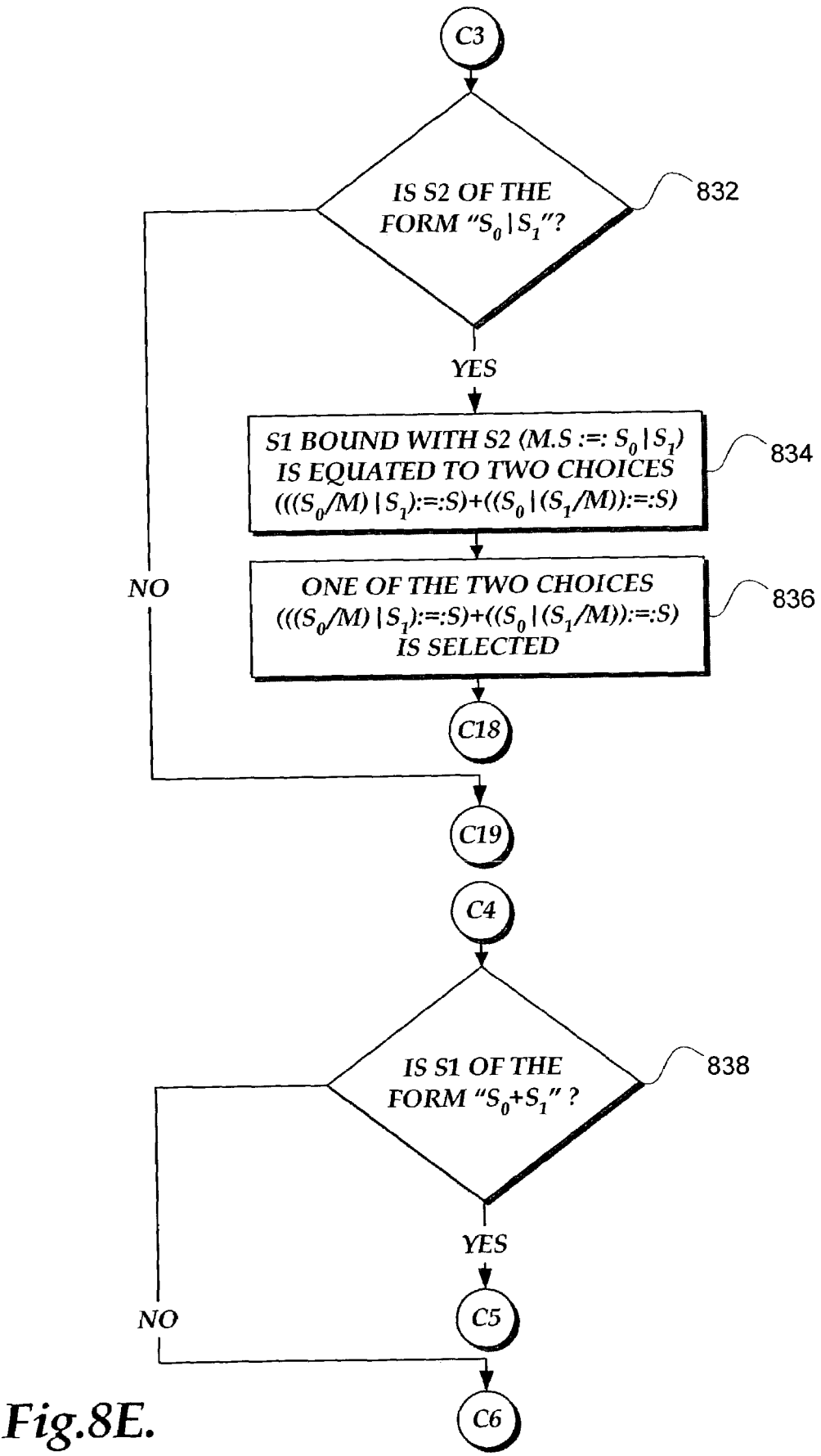
Figure 8F:
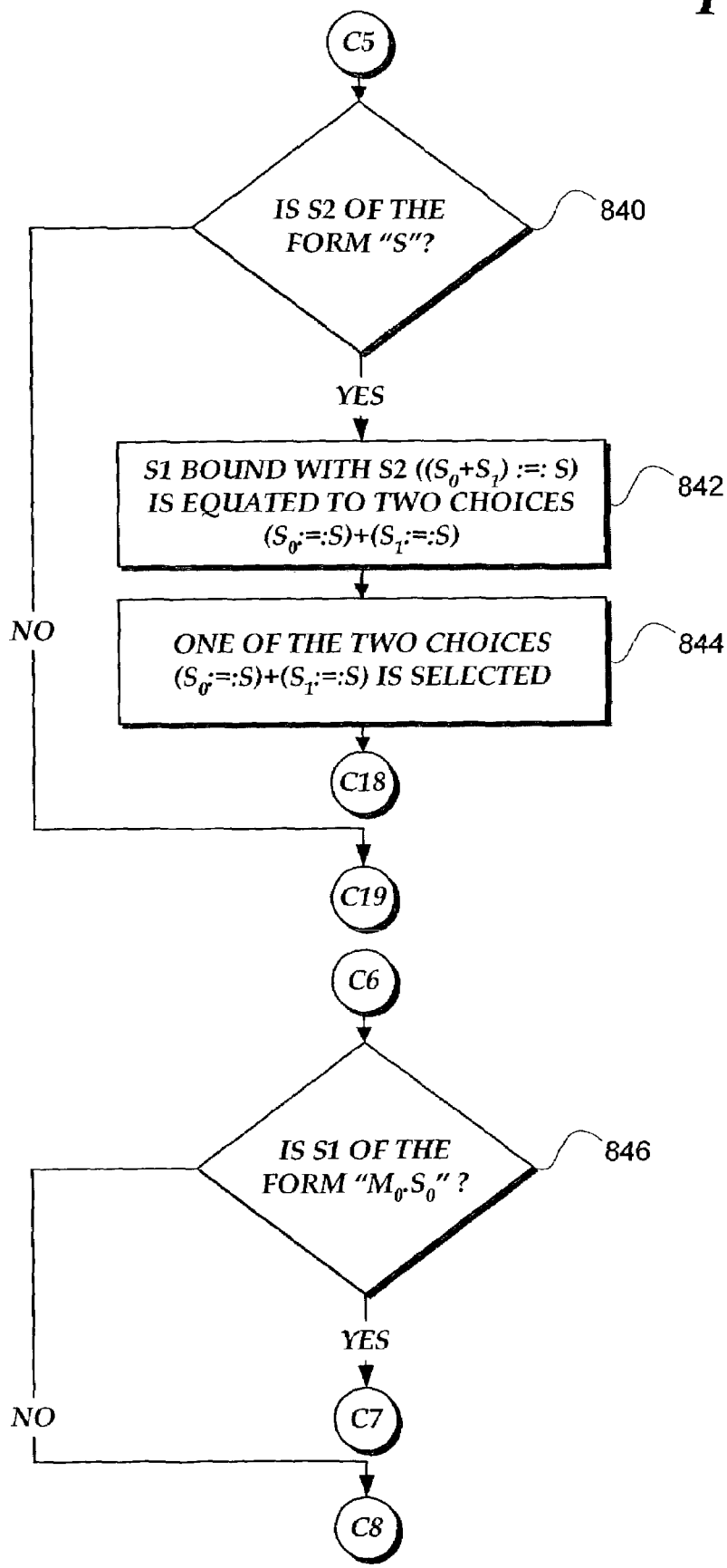
Figure 8G:
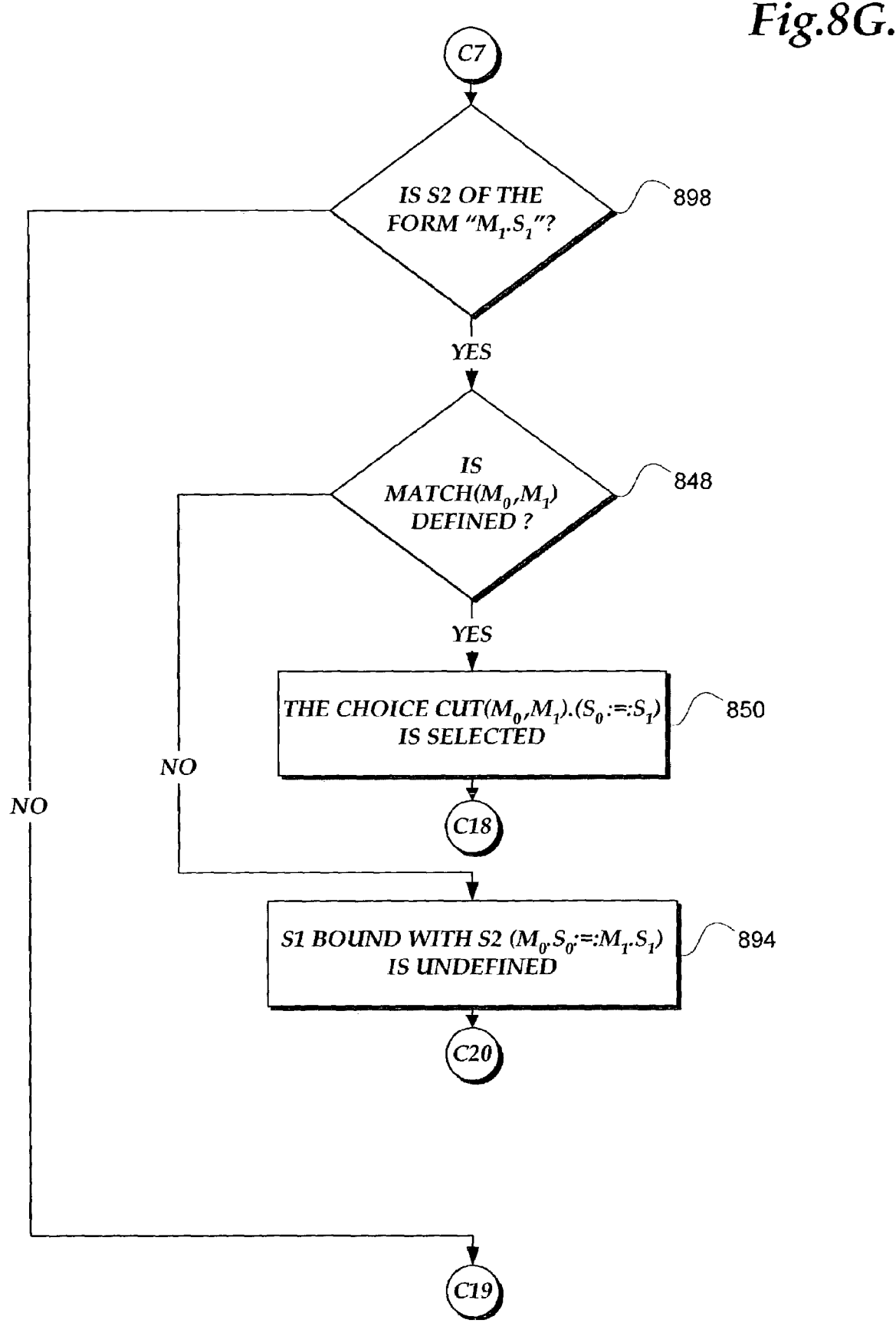
Figure 8H:
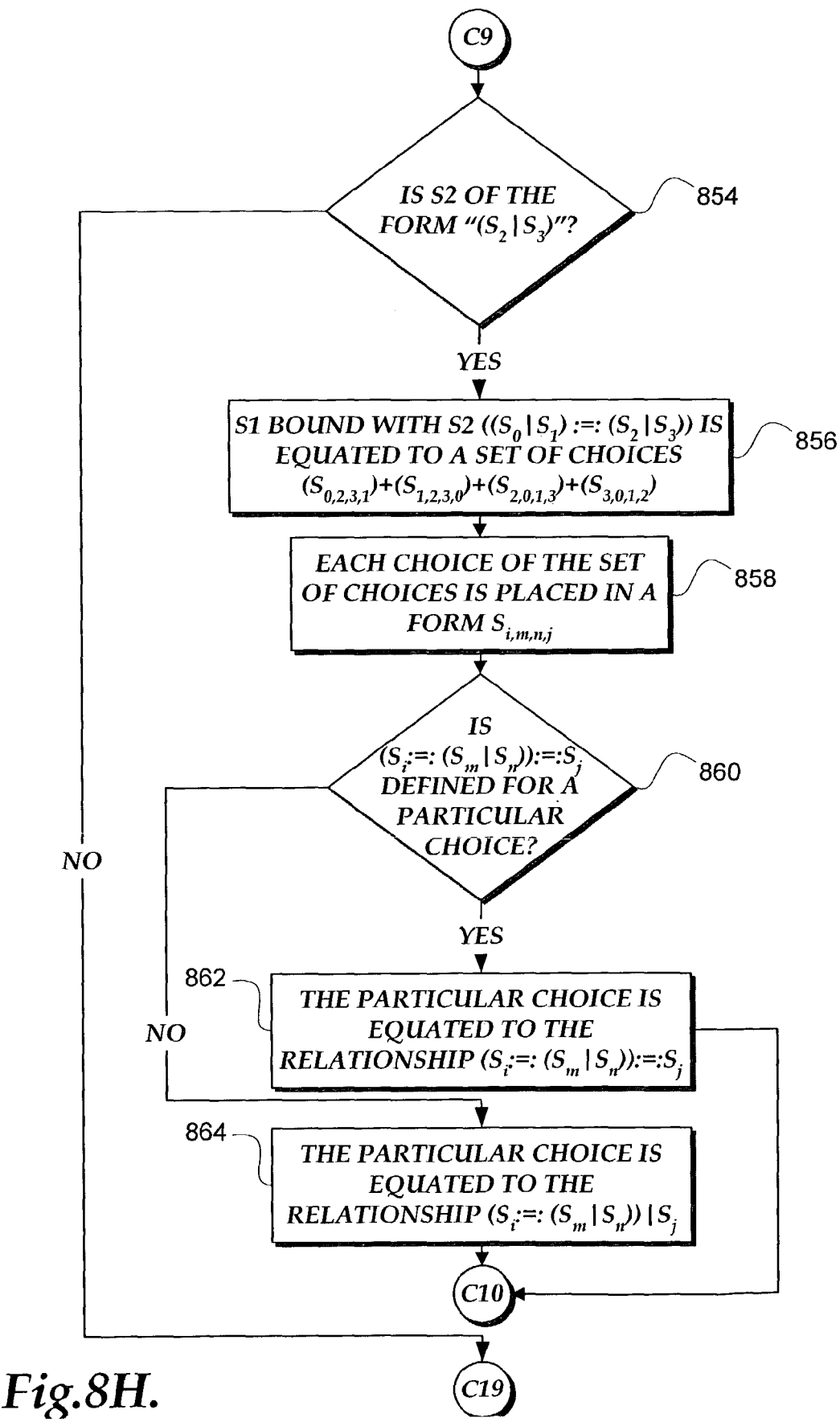
Figure 8I:
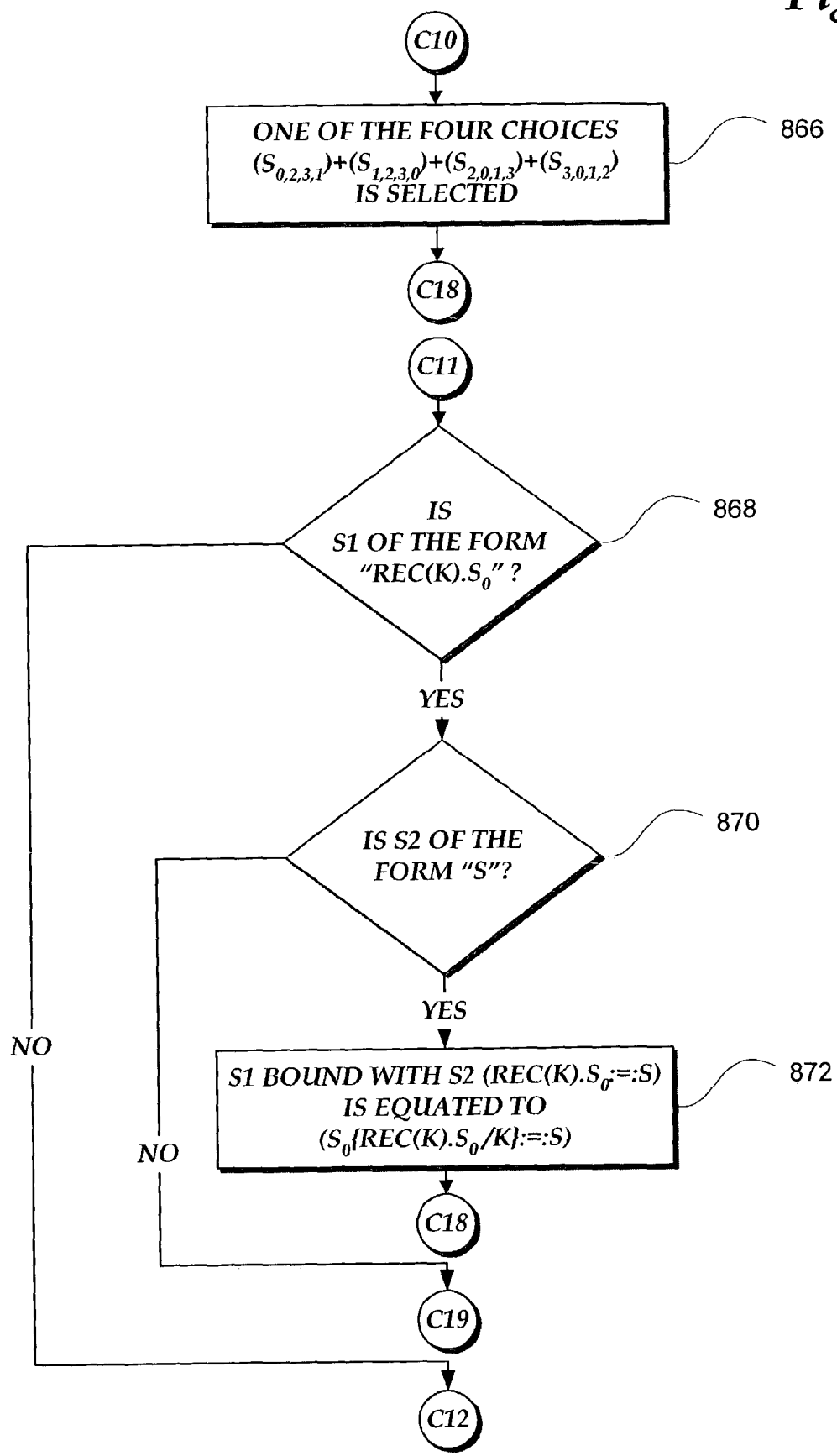
Figure 8J:
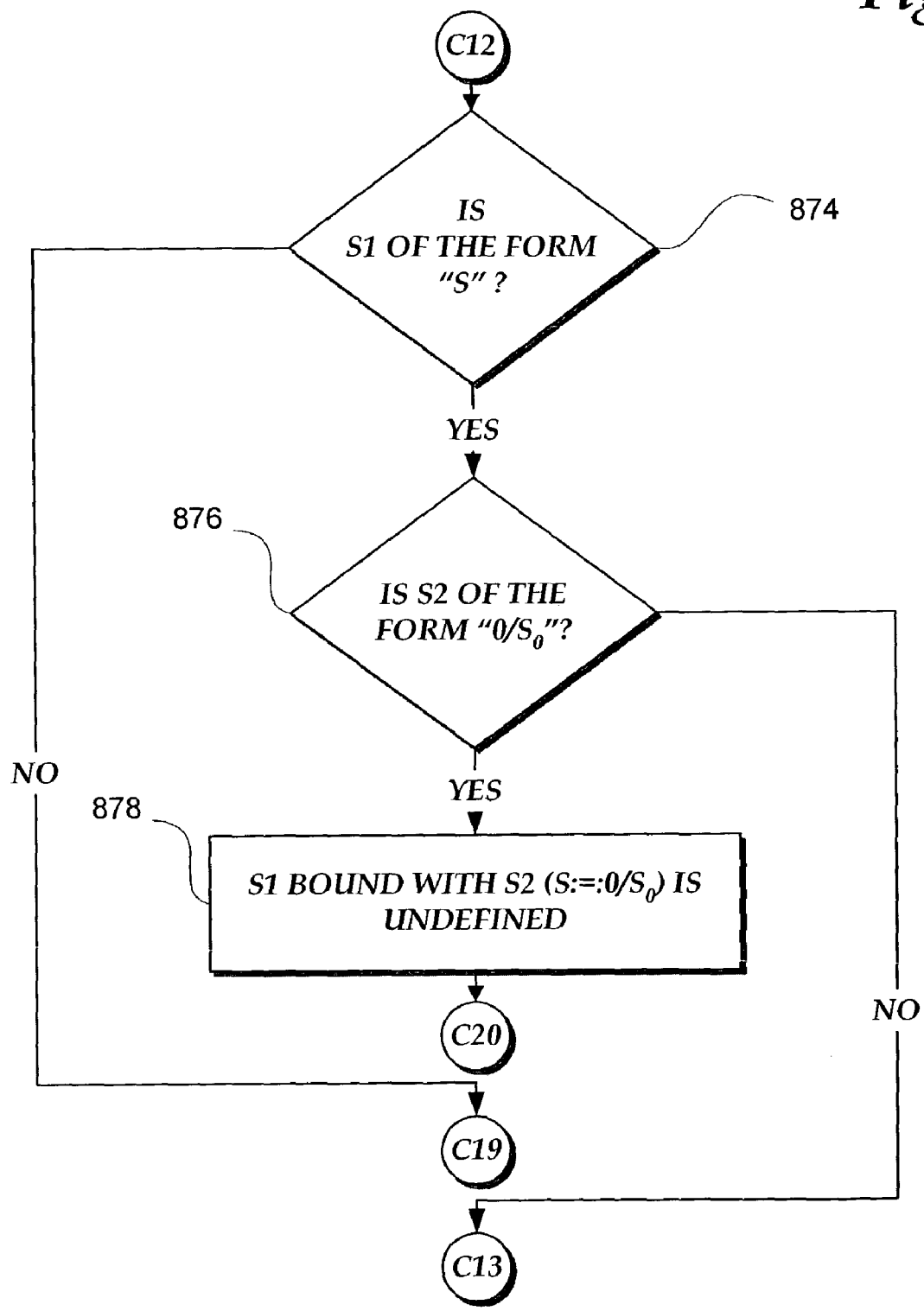
Figure 8K:
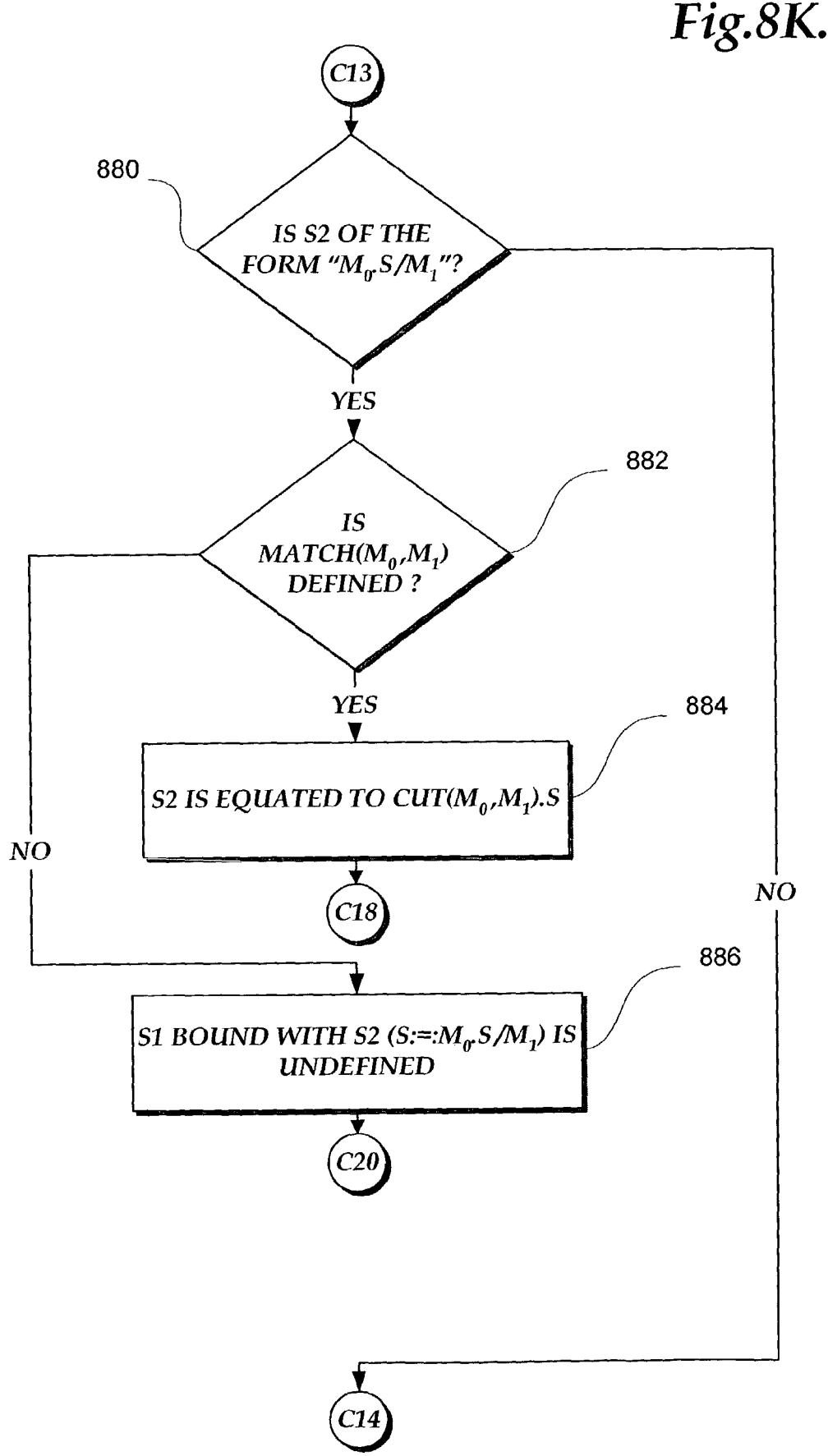
Figure 8L:
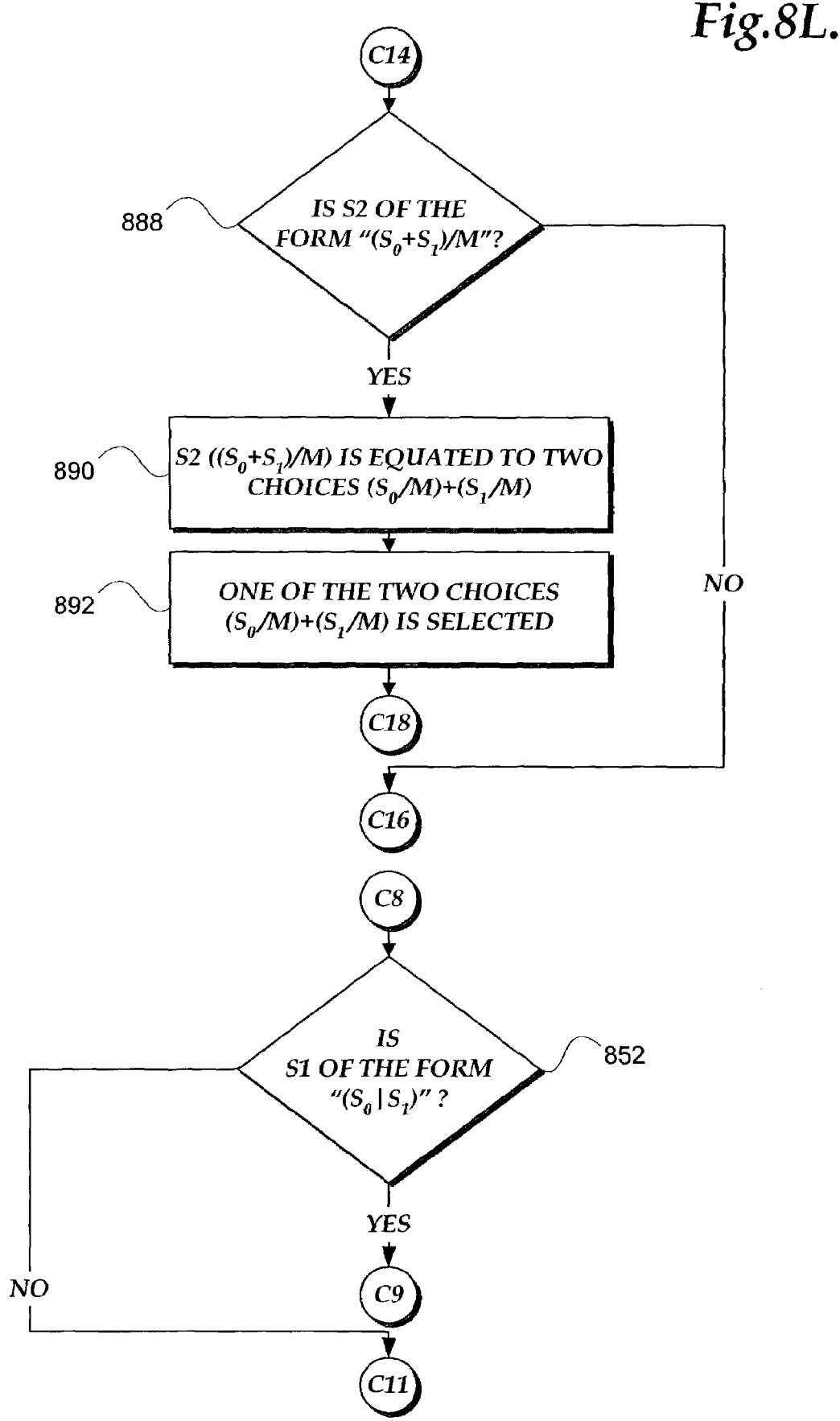
Figure 8M:
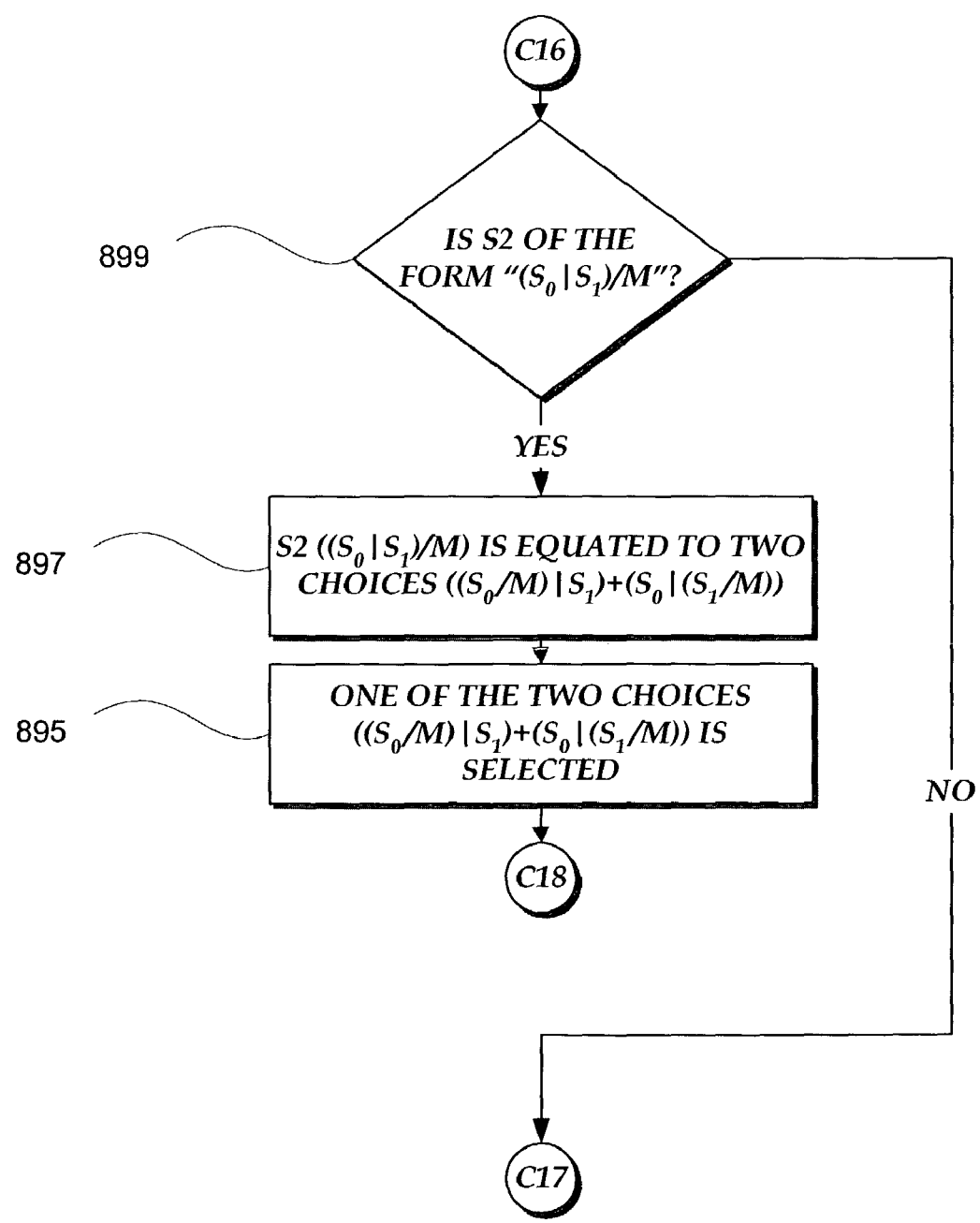
Figure 8N:
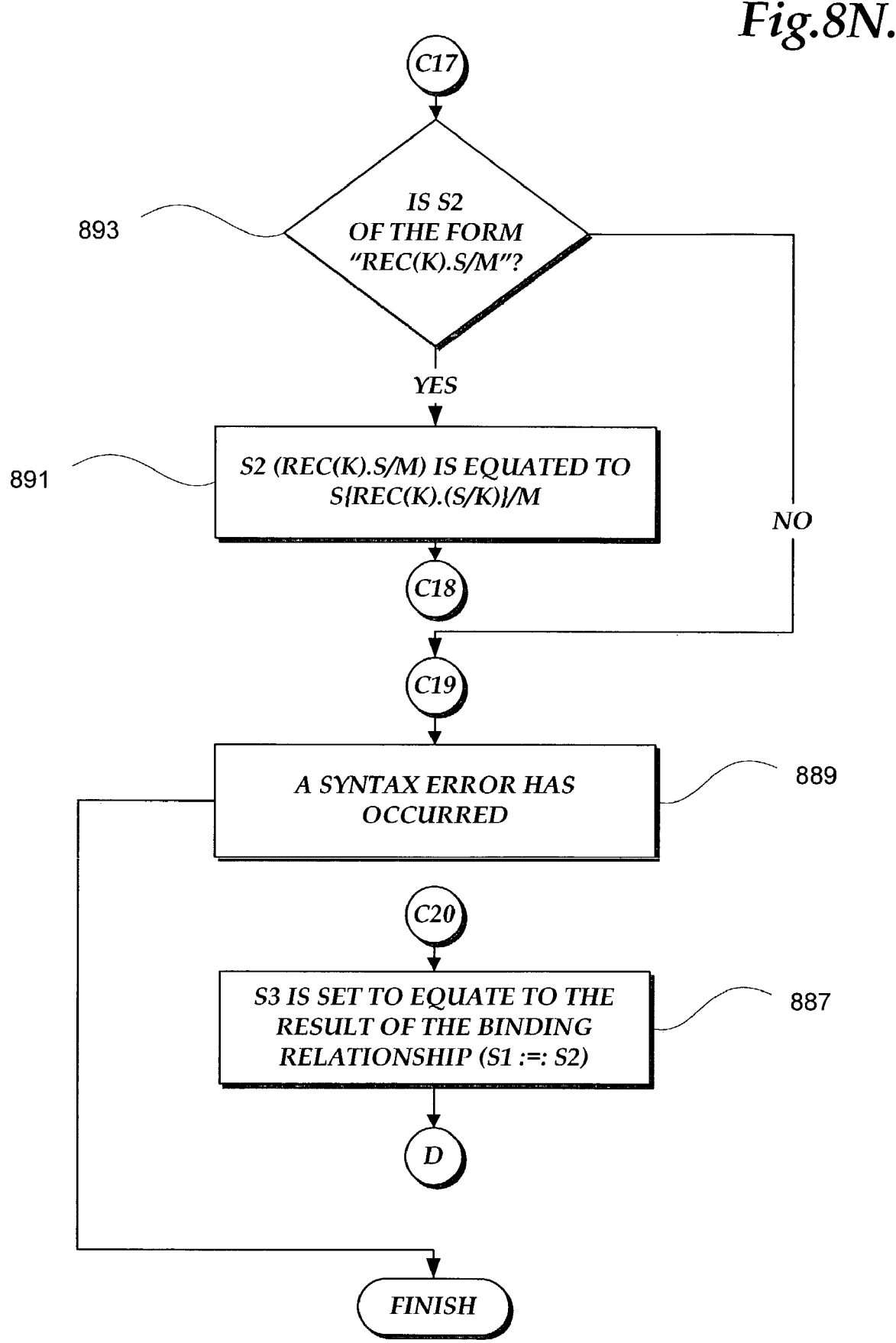
Figure 8O:
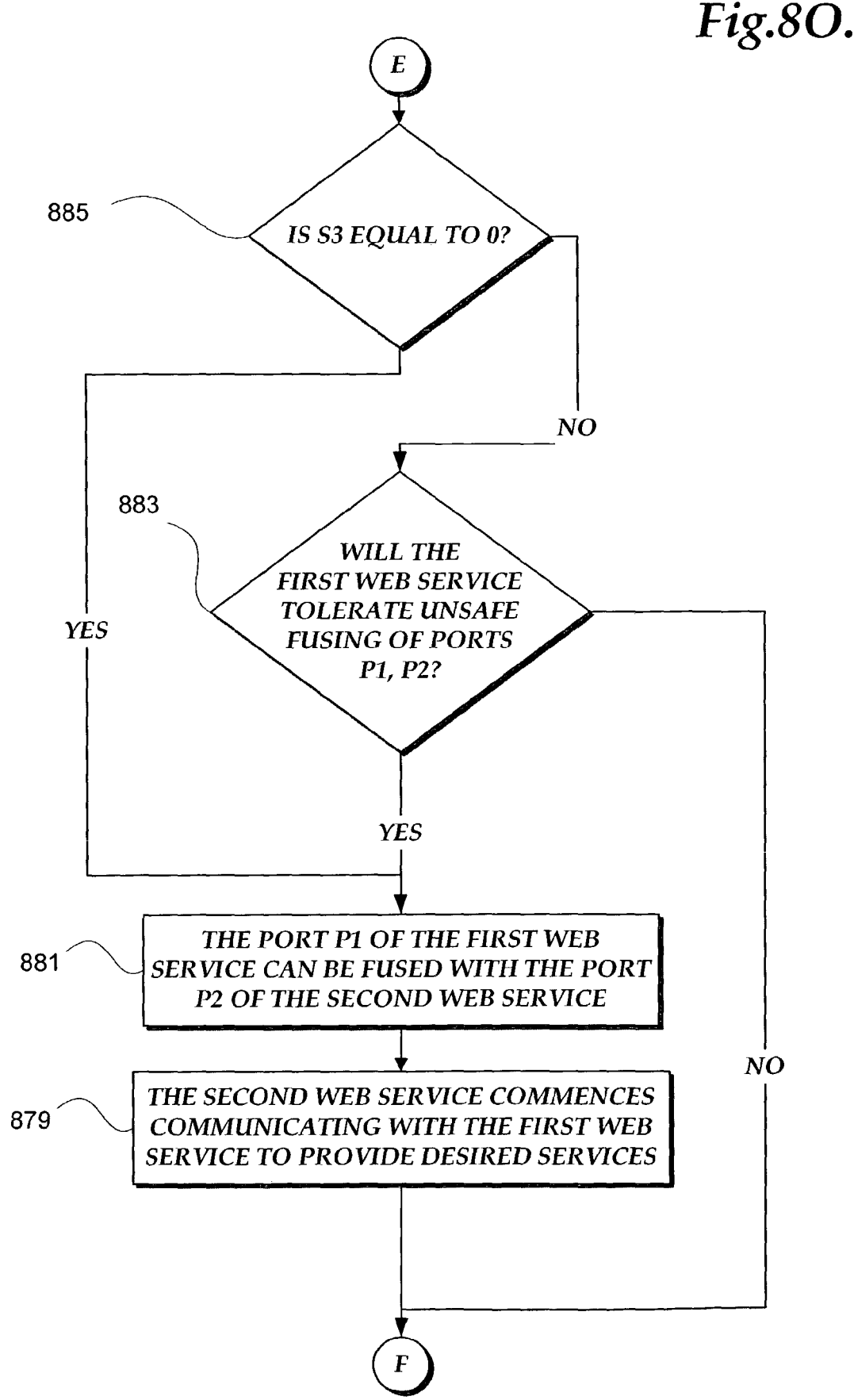

FIGS. 8A-8O illustrate a method 800 for forming interoperability among Web services, such as the first Web service 706 and the second Web service 710. For clarity purposes, the following description of the method 800 makes references to various elements illustrated in connection with the model syntax 702 and the system 700 shown in FIGS. 7A-7B. From a start block, the method 800 proceeds to a set of method steps 802, defined between a continuation terminal ("terminal A") and an exit terminal ("terminal B"). The set of method steps 802 describes the creation of Web service specifications that correspond to Web service programs for first and second Web services 706, 710.

From terminal A (FIG. 8B), the method 800 proceeds to a block 808 where a developer creates abstract definitions for a specification of the first Web service 706. Abstract definitions of a specification include definitions of data types, messages, and porttypes. Next, the developer creates concrete descriptions for the specification. See block 810. Concrete descriptions include bindings (not to be confused with the binding mechanism formed in accordance with the invention and described below), which are where protocols, serialization, and encoding of data transmission are specified. The concrete descriptions include service elements, which specify port addresses of each binding. The developer then creates a safety S1 706A governing the invocation of operations, such as the message1 operation 706B and the message2 operation 706C, for the specification of the first Web service 706. See block 812. The developer then preferably places the safety S1 706A (hereinafter "S1") into the definition of the porttype for the port 606D. See block 814. Steps 808-814 can be repeated to create a specification for the second Web service 710 including a safety S2 710A (hereinafter "S2"). Next, the method 800 proceeds to the exit terminal B.

From the exit terminal B (FIG. 8A), the method 800 proceeds to a set of method steps 804, defined between a continuation terminal ("terminal C") and an exit terminal ("terminal D"). The set of method steps 804 describe the discovery of the second Web service 710 by the first Web service 706 and the verification of the ability of the second Web service 710 to safely interact with the first Web service 706.

From terminal C (FIG. 8C) the method 800 proceeds to a block 816 where the first Web service 706 discovers a porttype of the port 710D using the specification of the second Web service 710 via a suitable discovery service. One suitable discovery service includes a UDDI service, but others are possible. The first Web service 706 then selects a porttype of the port 706D, which is to be fused with the port 710D, from the specification of the first Web service 706. See block 818. The first Web service 706 then extracts the safety S1 of the porttype of the port 706D and the safety S2 of the porttype of the port 710D. See block 820. Next, the process 800 enters another continuation terminal ("terminal C18"). From terminal C18, the process 800 enters block 822 where the first Web service 706 checks the interoperability between ports 706D, 710D by attempting to place safeties S1, S2 into a binding relationship (S1:=:S2). At decision block 824, the first Web service 706 checks whether the safety S1 is of the form "0", which denotes inactivity or the stop safety. If the answer is YES to the test at decision block 824, the method 800 proceeds to another continuation terminal ("terminal C1"). Otherwise, if the answer is NO, the method 800 proceeds to another terminal ("terminal C2").

From terminal C1 (FIG. 8D), the method 800 proceeds to another decision block 826 where the first Web service 706 determines whether the safety S2 is of the form "S" 702A. If the answer is NO, another continuation terminal ("terminal C19") is entered. Otherwise, if the answer is YES to the test at decision block 826, the binding relationship between the safety S1 and the safety S2 (0:=:S) is equated to S2. See block 828. From here, the method 800 proceeds to another continuation terminal ("terminal C20").

From terminal C2 (FIG. 8D), the method 800 proceeds to another decision block 830 where the first Web service 706 determines whether the safety S1 is of the form "M.S" 702C. If the answer is YES, another continuation terminal ("terminal C3") is entered. Otherwise, if the answer is NO, the method 800 proceeds to another continuation terminal ("terminal C4").

From terminal C3 (FIG. 8E) the method 800 proceeds to another decision block 832 where the first Web service 706 determines whether the safety S2 is of the form "$S_0|S_1$" 706F, which denotes the parallel safety. If the answer is NO, the process 800 enters the terminal C19. Otherwise, if the answer is YES to the test at decision block 832, block 834 is entered where the safety S1 bound with the safety S2 (M.S:=$S_0|S_1$) is equated to two choices $(((S_0/M)|S_1):=:S)+((S_0|(S_1/M)):=:S)$. One of the two choices is then selected. See block 836. Next, the method 800 enters continuation terminal 18 to loop back to block 822 and the above steps are repeated.

From terminal C4 (FIG. 8E) the method 800 proceeds to another decision block 838 where the first Web service 706 determines whether the safety S1 is of the form "$S_0+S_1$", which denotes a choice safety 702D. If the answer is YES, another continuation terminal ("terminal C5") is entered. Otherwise, the method 800 proceeds to another continuation terminal ("terminal C6").

From terminal C5 (FIG. 8F) the method 800 proceeds to another decision block 840 where the first Web service 706 determines whether the safety S2 is of the form "S" 702A. If the answer is NO, continuation terminal C19 is entered by the method 800. Otherwise, if the answer is YES, the safety S1 bound with the safety S2 $((S_0+S_1):=:S))$ is equated to two choices $((S_0:=:S)+(S_1:=:S))$. See block 842. One of these two choices is then selected. See block 844. Next, the method 800 enters the continuation terminal C18 to loop back to 822 where the above-described steps are repeated.

From the terminal C6 (FIG. 8F) another decision block 846 is entered by the method 800 where the first Web service 706 determines whether the safety S1 is of form "$M_0S_0$", which is a sequence safety 702C. If the answer is NO to the test at decision block 826, another continuation terminal ("terminal C8") is entered. If instead, the answer is YES, the method 800 proceeds to another continuation terminal ("terminal C7").

From terminal C7 (FIG. 8G) the method 800 proceeds to another decision block 898 where the first Web service 706 determines whether the safety S2 is of the form "$M_1.S_1$" 702C. If the answer is NO, the method 800 proceeds to terminal C19. Otherwise, if the answer is YES, block 848 is entered where the first Web service 706 determines whether a match function, which takes $M_0$, $M_1$ as arguments, is defined. See block 848. A simple implementation of the match function includes a return of a TRUE Boolean result if $M_0$ is the complement of $M_1$. Otherwise, the match function would return a FALSE Boolean result. If the answer to the test at decision block 848 is NO, the safety S1 bound with the safety S2 $(M_0.S_0:=:M_1.S_1)$ is undefined. See block 894. The method 800 then proceeds to terminal C20. If the answer to the test at decision block 848 is YES, the choice "cut $(M_0, M_1).(S_0:=:S_1)$" is selected, where cut is a function that takes $M_0$, $M_1$ as arguments. One preferable implementation of the cut function is shown in FIGS. 6A-6I, which shows the interoperability among Purchaser, Supplier, Shipper Web services. If the match function is defined to match types to corresponding types of messages and the cut function is defined to remove these pairs (types and corresponding types), the actions of the Purchaser Web service are joins. In other words, the Purchaser Web service waits for both the purchase order (PO) to be consumed and the advanced shipping notice (ASN) to be supplied before advancing in the safety. Next, the method 800 proceeds to terminal C18 to loop back to block 822 where the above-described method steps are repeated.

From terminal C8 (FIG. 8L) the, method 800 proceeds to another decision block 852 where the first Web service 706 determines whether the safety S1 706A is of the form "$S_0|S_1$", which denotes the parallel safety 702F. If the answer is NO, the method 800 proceeds to another continuation terminal ("terminal C11"). Otherwise, if the answer is YES, another continuation terminal ("terminal C9") is entered.

From terminal C9 (FIG. 8H) the method 800 proceeds to another decision block 854 where the first Web service 706 determines whether the safety S2 of the second Web service 710 is of the form "$S_2|S_3$", which is in the form of the parallel safety 702F. If the answer is NO to the test at decision block 854, the method 800 proceeds to terminal C19. Otherwise, if the answer is YES, block 856 is entered by the method 800. At this block, the safety S1 bound with the safety S2 $((S_0|S_1):=:(S_2|S_3))$ is equated to a set of four choices $(S_{0,2,3,1})+(S_{1,2,3,0})+(S_{2,0,1,3})+(S_{3,0,1,2})$. Each of the four choices can be placed in a form $S_{i,m,n,j}$. See block 858. For each choice of the four choices, a test is made to determine whether the relationship $(S_i:=:(S_m|S_n)):=:S_j$ is defined for a particular choice. See decision block 860. If the answer to the test at decision block 860 is YES, the particular choice is then equated to the relationship $(S_i:=:(S_m|S_n)):=:S_j$. See block 862. Next, the method 800 proceeds to another continuation terminal ("terminal C10"). If instead the answer is NO, block 864 is entered where the particular choice is equated to the relationship $(S_i:=:(S_m|S_n))|S_j$. The method 800 then also proceeds to the terminal C10.

From terminal C10 (FIG. 8I), the method 800 proceeds to block 866 where one of the four choices $(S_{0,2,3,1})+(S_{1,2,3,0})+(S_{2,0,1,3})+(S_{3,0,1,2})$ is selected. The process 800 then proceeds to terminal C18 to loop back to block 822 where the above-described method steps are repeated.

From the terminal C11 (FIG. 8I) the method 800 proceeds to another decision block 868 where the first Web service 706 determines whether the safety S1 is of form rec(K).$S_0$, which denotes a recursion safety 702G. If the answer is NO to the test at decision block 868, another continuation terminal ("terminal C12") is entered. Otherwise, if the answer is YES, another decision block 870 is entered where the first Web service 706 checks whether the safety S2 is of the form "S" 702A. If the answer is NO to the test at decision block 870, terminal C19 is entered by the method 800. If instead, the answer is YES, the method 800 proceeds to block 872 where the safety S1 bound with the safety S2 (rec(K).$S_0$:=:S) is equated to ($S_0$\{rec(K).$S_0$/K\}:=:S). The syntactical phrase $S_0$\{rec(K).$S_0$/K\} means that wherever in the safety $S_0$ there is a mention of K, which is a name as defined by the model syntax 702, K is replaced by rec(K).$S_0$. Consider the following example: if the phrase "$S_0$\{rec(K).$S_0$/K\}" were to be applied to the safety sentence "$S_0$=open.close.$S_0$", the result would be as follows: "$S_0$=open.close.rec($S_0$).open.close.$S_0$". Thus, the "$S_0$" in the example is the K in the recursion safety "rec(K)". Next, the method 800 proceeds to terminal C18 to loop back to block 822 where the above-described method steps are repeated. If the answer to the test at decision block 870 is NO, the method 800 proceeds to terminal C19.

From terminal C12 (FIG. 8J), the method 800 proceeds to another decision block 874 where the first Web service 706 checks whether the safety S1 is of the form "S" 702A. If the answer is NO, the method 800 proceeds to terminal C19. Otherwise, if the answer is YES, another decision block 876 is entered. At this decision block, the first Web service 706 determines whether the safety S2 is of the form "0/$S_0$". If the answer is NO, the method 800 proceeds to another continuation terminal ("terminal C13"). Otherwise, if the answer to the test at decision block 876 is YES, the safety S1 bound with the safety S2 (S:=:0/$S_0$) is undefined. See block 878. The method 800 then proceeds to terminal C20.

From terminal C13 (FIG. 8K), the method 800 proceeds to another decision block 880 where the first Web service 706 verifies whether the safety S2 is of the form "$M_0$.S/$M_1$". If the answer is NO, the method 800 proceeds to another continuation terminal 15, ("terminal C14"). If the answer is YES, the first Web service 706 determines whether a match function, which takes $M_0$, $M_1$ as arguments, is defined. See block 882. A simple implementation of the match function includes a return of a TRUE Boolean result if $M_0$ is the complement of $M_1$. Otherwise, the match function would return a FALSE Boolean result. If the answer to the test at decision block 882 is NO, the safety S1 bound with the safety S2 (S:=:$M_0$.S/$M_1$) is undefined. See block 886. The method 800 then proceeds to terminal C20. If the answer to the test at decision block 882 is YES, the safety S2 is equated to "cut ($M_0$, $M_1$).S", where cut is a function that takes $M_0$, $M_1$ as arguments. One preferable implementation of the cut function is shown in FIGS. 6A-6I, which shows the interoperability among Purchaser, Supplier, Shipper Web services. If the match function is defined to match types to corresponding types of messages and the cut function is defined to remove these pairs (types and corresponding types), the actions of the Purchaser Web service are joins. In other words, the Purchaser Web service waits for both the purchase order (PO) to be consumed and the advanced shipping notice (ASN) to be supplied before advancing in the safety. Next, the process 800 proceeds to terminal C18 to loop back to block 822 where the above-described method steps are repeated.

From terminal C14 (FIG. 8L), the method 800 proceeds to another decision block 888 where the first Web service 706 determines whether the safety S2 is of the form "($S_0$+$S_1$)/M". If the answer is YES, the safety S2 is equated to two choices ($S_0$/M)+($S_1$/M). See block 890. One of these two choices is selected. See block 892. Next, the method 800 proceeds to terminal C18 to loop back to block 822 where the above-described method steps are repeated. If the answer to the test at decision block 888 is NO, the method 800 proceeds to another continuation terminal ("terminal C16").

From terminal C16 (FIG. 8M) the method 800 proceeds to another decision block 899 where the first Web service 706 checks the safety S2 to determine whether it has the form ($S_0$|$S_1$)/M. If the answer is NO, the method 800 proceeds to another continuation terminal ("terminal C17"). Otherwise, the answer is YES, and the safety S2 is equated to two choices ($S_0$/M)&($S_1$/M). See block 897. Next, the process 800 proceeds to block 895 where one of the two choices is then selected. Then, the method 800 proceeds to the terminal C18 to loop back to block 822 where the above-described method steps are repeated.

From terminal C17 (FIG. 8N) the method 800 proceeds to another decision block 893 where the first Web service 706 determines whether the safety S2 is of the form rec(K).S/M. If the answer is YES, the safety S2 is equated to (S\{rec(K).(S/K)\}/M). See block 891. The method 800 then proceeds to terminal C18 to loop back to block 822 where the above-described method steps are repeated. Otherwise, the answer to the test at decision block 893 is NO, and terminal C19 is entered.

From terminal C19 (FIG. 8N) the first Web service 706 determines that a syntax error has occurred because either the safety S1 or the safety S2 does not comply with the model syntax 702. See block 889. Fusing between ports 706D, 710D is not possible because safeties S1, S2 are not in a form that can be computed. The method 800 then terminates processing. From terminal C20 (FIG. 8N), the method 800 proceeds to block 887 where a temporary safety S3 is set to equate to the result of the binding relationship between the safeties S1 and the safety ($S_3$=$S_1$:=:$S_2$). The method 800 then enters exit terminal D.

From exit terminal D, the method 800 proceeds to a set of method steps 806, defined between a continuation terminal ("terminal E") and an exit terminal ("terminal F"). The set of method steps 806 creates a virtual contract, which is a binding agreement, between the first Web service 706 and the second Web service 710 if the safeties S1 and the safety S2 can be aligned in a suitable manner that allows for safe interoperability between the first Web service 706 and the second Web service 710.

From terminal E (FIG. 8O) the method 800 proceeds to another decision block 885 where the first Web service 706 determines whether the safety S3 (which is the result of the binding relationship between the safety S1 and the safety S2) is equal to zero. If the answer to the test at decision block 885 is YES, the port 706D of the first Web service 706 can be fused with the port 710D of the second Web service 710. See block 881. When two ports can be fused in this way, the interoperability between the first Web service 706 and the second Web service 710 is safe. The term "safe" means that there exists an input guarded process; that every output has met an input; or that there is no deadlock because the input of either the first Web service 706 or the second Web service 710 is always available to receive messages to process them. Once ports 706D, 710D are fused, the second Web service 710 can commence communicating with the first Web service 706 to provide or to obtain desired services. See block 879. The method 800 then proceeds to exit terminal F where it terminates processing.

If the answer to the test at decision block 885 is NO, another decision block 883 is entered where the first Web service 706 determines whether it can tolerate a certain degree of unsafe fusing of ports 706D, 710D. If the answer is YES, method steps 881, 879 are repeated. Otherwise, the answer to the test at decision block 883 is NO; ports 706D, The embodiments of the invention in which an exclusive property or privilege is claimed are defined as follows:

1. A computer-implemented method for checking the compatibility of a first porttype of a first Web service and a second porttype of a second Web service, the method comprising:
    extracting a first safety (S1) from the first porttype of the first Web service and a second safety (S2) from the second porttype of the second Web service;
    testing the compatibility of the first safety with the second safety by binding the first safety with the second safety (S1:=:S2) to determine whether the result of the binding produces interoperability between Web services;
    wherein the first safety or the second safety restricts an order in which external applications can invoke operations of the first Web service or the second Web service,
    and further wherein the first safety or the second safety at least in part comprises a sequence safety, a parallel safety, a choice safety, a recursion safety, or a safety of the form ($O/S_0$).

2. The method of claim 1, wherein the first Web service includes a first port of the first porttype and the second Web service includes a second port of the second porttype, the first port being fusible with the second port if the result of the binding produces safe interoperability between Web services.

3. The method of claim 1, wherein the first Web service includes a first port of the first porttype and the second Web service includes a second port of the second porttype, the first port being fusible with the second port if the result of the binding produces questionable interoperability and the first Web service and the second Web service tolerate the fusing of the first port and the second port.

4. The method of claim 1, wherein if the first safety is a stop safety (0) and the second safety is of the form (S), the result of the binding is the second safety.

5. The method of claim 1, wherein if the first safety is a sequence safety (M.S) and the second safety is a parallel safety ($S_0|S_1$), the result of the binding is a choice safety $(((S_0/M)|S_1):=:S)+((S_0|(S_1/M)):=:S)$.

6. The method of claim 1, wherein if the first safety is a choice safety ($S_0+S_1$) and the second safety is of the form (S), the result of the binding is a choice safety $((S_0:=:S)+(S_1:=:S))$.

7. The method of claim 1, wherein if the first safety is of the form ($M_0.S_0$) and the second safety is of the form ($M_1.S_1$) and a match function (match($M_0, M_1$)) is defined, the result of the binding is equated to a safety having the relationship (cut($M_0, M_1$).($S_0:=:S_1$)) or otherwise the result of the binding is undefined.

8. The method of claim 1, wherein if the first safety is a parallel safety ($S_0|S_1$) and the second safety is another parallel safety ($S_2|S_3$), the result of the binding is a choice safety $((S_{0,2,3,1})+(S_{1,2,3,0})+(S_{2,0,1,3})+(S_{3,0,1,2}))$.

9. The method of claim 8, wherein each choice in the choice safety $((S_{0,2,3,1})+(S_{1,2,3,0})+(S_{2,0,1,3})+(S_{3,0,1,2}))$ can be placed in a form ($S_{i,m,n,j}$), wherein if a relationship (($S_i$:=:($S_m|S_n$)):=:$S_j$) is defined for a particular choice, the result of the binding is the relationship (($S_i$:=:($S_m|S_n$)):=:$S_j$) or otherwise the result of the binding is another relationship (($S_i$:=:($S_m|S_n$))|$S_j$).

10. The method of claim 1, wherein if the first safety is a recursion safety (rec(K).$S_0$) and the second safety is of the form (S), the result of the binding is a relationship ($S_0${rec(K).$S_0$/K}:=:S).

11. The method of claim 1, wherein if the first safety is of the form (S) and the second safety is of the form (0/$S_0$), the result of the binding is undefined.

12. The method of claim 1, wherein if the first safety is of the form (S) and the second safety is of the form ($M_0.S/M_1$) and a match function (match($M_0, M_1$)) is defined, the result of the binding is equated to a cut function (cut($M_0, M_1$)).

13. The method of claim 1, wherein if the first safety is of the form (S) and the second safety is of the form ($M_0.S/M_1$) and a match function (match($M_0, M_1$)) is not defined, the result of the binding is undefined.

14. The method of claim 1, wherein if the first safety is of the form (S) and the second safety is of the form (($S_0+S_1$)/M), the result of the binding is equated to a choice safety $(($S_0$/M)+(S_1/M))$.

15. The method of claim 1, wherein if the first safety is of the form (S) and the second safety is of the form (($S_0|S_1$)/M), the result of the binding is equated to a safety of the form $(($S_0$/M)|S_1)+(S_0|(S_1/M))$.

16. The method of claim 1, wherein if the first safety is of the form (S) and the second safety is of the form (rec(K).S/M), the result of the binding is equated to a recursion safety $S\{rec(K).(S/K)\}/M$.

17. A computer-readable storage medium having computer-executable instructions for performing a method for checking the compatibility of a first porttype of a first Web service and a second porttype of the second Web service, the method comprising:
    extracting a first safety (S1) from the first porttype of the first Web service and a second safety (S2) from the second porttype of the second Web service;
    testing the compatibility of the first safety with the second safety by binding the first safety with the second safety (S1:=:S2) to determine whether the result of the binding produces interoperability between Web services;
    wherein the first safety or the second safety restricts an order in which external applications can invoke operations of the first Web service or the second Web service,
    and further wherein the first safety or the second safety at least in part comprises a sequence safety, a parallel safety, a choice safety, a recursion safety, or a safety of the form (0/$S_o$).

18. The method of claim 17, wherein the first Web service includes a first port of the first porttype and the second Web service includes a second port of the second porttype, the first port being fusable with the second port if the result of the binding produces safe interoperability between Web services.

19. The method of claim 17, wherein the first Web service includes a first port of the first porttype and the second Web service includes a second port of the second porttype, the first port being fusable with the second port if the result of the binding produces questionable interoperability and the first Web service and the second Web service tolerate the fusing of the first port and the second port.

20. The method of claim 17, wherein if the first safety is a stop safety (0) and the second safety is of the form (S), the result of the binding is the second safety.

21. The method of claim 17, wherein if the first safety is a sequence safety (M.S) and the second safety is a parallel safety ($S_0|S_1$), the result of the binding is a choice safety$(((S_0/M)|S_1):=:S)+((S_0|(S_1/M)):=:S)$.

22. The method of claim 17, wherein if the first safety is a choice safety $(S_0+S_1)$ and the second safety is of the form $(S)$, the result of the binding is a choice safety $((S_0:=:S)+(S_1:=:S))$.

23. The method of claim 17, wherein if the first safety is of the form $(M_0.S_0)$ and the second safety is of the form $(M_1.S_1)$ and a match function $(\text{match}(M_0, M_1))$ is defined, the result of the binding is equated to a safety having the relationship $(\text{cut}(M_0, M_1).(S_0:=:S_1))$ or otherwise the result of the binding is undefined.

24. The method of claim 17, wherein if the first safety is a parallel safety $(S_0|S_1)$ and the second safety is another parallel safety $(S_2|S_3)$, the result of the binding is a choice safety $((S_{0,2,3,1})+(S_{1,2,3,0})+(S_{2,0,1,3})+(S_{3,0,1,2}))$.

25. The method of claim 24, wherein each choice in the choice safety $((S_{0,2,3,1})+(S_{1,2,3,0})+(S_{2,0,1,3})+(S_{3,0,1,2}))$ can be placed in a form $(S_{i,m,n,j})$, wherein if a relationship $((S_i:=:(S_m|S_n)):=:S_j)$ is defined for a particular choice, the result of the binding is the relationship $((S_i:=:(S_m|S_n)):=:S_j)$ or otherwise the result of the binding is another relationship $((S_i:=:(S_m|S_n))|S_j)$.

26. The method of claim 17, wherein if the first safety is a recursion safety $(\text{rec}(K).S_0)$ and the second safety is of the form $(S)$, the result of the binding is a relationship $(S_0\{\text{rec}(K).S_0/K\}:=:S)$.

27. The method of claim 17, wherein if the first safety is of the form $(S)$ and the second safety is of the form $(0/S_0)$, the result of the binding is undefined.

28. The method of claim 17, wherein if the first safety is of the form $(S)$ and the second safety is of the form $(M_0.S/M_1)$ and a match function $(\text{match}(M_0, M_1))$ is defined, the result of the binding is equated to a cut function $(\text{cut}(M_0, M_1))$.

29. The method of claim 17, wherein if the first safety is of the form $(S)$ and the second safety is of the form $(M_0.S/M_1)$ and a match function $(\text{match}(M_0, M_1))$ is not defined, the result of the binding is undefined.

30. The method of claim 17, wherein if the first safety is of the form $(S)$ and the second safety is of the form $((S_0+S_1)/M)$, the result of the binding is equated to a choice safety $((S_0/M)+(S_1/M))$.

31. The method of claim 17, wherein if the first safety is of the form $(S)$ and the second safety is of the form $((S_0|S_1)/M)$, the result of the binding is equated to a safety of the form $((S_0/M)|S_1)+(S_0|(S_1/M))$.

32. The method of claim 17, wherein if the first safety is of the form $(S)$ and the second safety is of the form $(\text{rec}(K).S/M)$, the result of the binding is equated to a recursion safety $S\{\text{rec}(K).(S/K)\}/M$.

33. A computer-implemented method determining compatibility of Web services, comprising:

extracting a first safety (S1) from a first porttype of a first Web service and a second safety (S2) from a second porttype of a second Web service;

testing the compatibility of the first safety with the second safety by binding the first safety with the second safety $(S1:=:S2)$ to determine whether the result of the binding produces interoperability between Web services;

wherein the first Web service includes a first port of the first porttype and the second Web service includes a second port of the second porttype, the first port being fusible with the second port if the result of the binding produces safe interoperability between Web services; and wherein the first safety and the second safety restrict an order in which external applications can invoke operations of the first Web service or the second Web service, and further wherein the first safety or the second safety at least in part comprises a sequence safety, a parallel safety, a choice safety, a recursion safety, or a safety of the form $(O/S_0)$.

* * * * *